(12) United States Patent
Carr et al.

(10) Patent No.: US 6,794,007 B2
(45) Date of Patent: Sep. 21, 2004

(54) ARTIFICIAL TURF AIRPORT MARKING SAFETY SYSTEM

(76) Inventors: Patrick J. Carr, 8637 Brookside Dr., Tinley Park, IL (US) 60477; Dale L. Collett, 3692 Highway 67, Sedalia, CO (US) 80135; William L. Schomburg, #6 Drawbridge, Suite #5, Springfield, IL (US) 62704; Thomas M. Sullivan, 10317 S. Longwood Dr., Unit L-7, Chicago, IL (US) 60643

( * ) Notice: Subject to any disclaimer, the term of this patent is extended or adjusted under 35 U.S.C. 154(b) by 70 days.

(21) Appl. No.: 09/816,524

(22) Filed: Mar. 23, 2001

(65) Prior Publication Data

US 2002/0064628 A1 May 30, 2002

Related U.S. Application Data

(63) Continuation-in-part of application No. 09/727,276, filed on Nov. 30, 2000, now Pat. No. 6,620,482.

(51) Int. Cl.[7] .............................................. B32B 33/00
(52) U.S. Cl. .............................. 428/87; 428/17; 428/15
(58) Field of Search .............................. 428/17, 87, 15

(56) References Cited

U.S. PATENT DOCUMENTS

| | | | |
|---|---|---|---|
| 3,687,021 A | | 8/1972 | Hensley |
| 3,735,988 A | | 5/1973 | Palmer et al. |
| 4,044,179 A | * | 8/1977 | Haas, Jr. |

(List continued on next page.)

FOREIGN PATENT DOCUMENTS

| | | |
|---|---|---|
| CA | 2238953 | 11/1999 |
| DE | 3901392 A1 | 7/1990 |
| WO | WO 02/15161 A1 | 2/2002 |
| WO | WO 02/20903 | 3/2002 |

OTHER PUBLICATIONS http:www.faarsp.com/h2.html, Aug. 24, 2001.
http:www.aopa.org/asf/publications/sa07, Jan. 29, 2001.
http://www.faarsp.com/e2.html, Jan. 29, 2001.
http://www.faarsp.com/aptsigns.htm, Jan. 29, 2001.
http://www.ntsb.gov/pressrel/2000/000613.htm, Aug. 24, 2001.
http://www.abcnews.go.com/sections/us/DailyNews/runway000613.html, Aug. 24, 2001.
http://www.avweb.com/other/aopa027a.html, Aug. 24, 2001.
http://www.faarsp.com/daily/cy00daily.htm, Aug. 24, 2001.
http://www.faarsp.com/ricats88–99.htm, Aug. 24, 2001.
http://www.faarsp.com/lightguns.htm, Aug. 24, 2001.
http://www.faarsp.com/pdpies97–99.htm, Aug. 24, 2001.
http://www.faarsp.com/rimonthly97–99.htm, Aug. 24, 2001.
http://www.faarsp.com/daily/ritot01–00.htm, Aug. 24, 2001.
http://www.faarsp.com/smgcs.htm, Jan. 29, 2001.

(List continued on next page.)

*Primary Examiner*—Deborah Jones
*Assistant Examiner*—Wendy Boss
(74) *Attorney, Agent, or Firm*—Bell, Boyd & Lloyd LLC

(57) ABSTRACT

The airport marking system of the present invention includes a multi-pigmented artificial turf segment having a backing with base fibers and marking fibers, wherein the marking fibers are visually different than the base fibers. The different marking fibers are adaptable to define a plurality of different shapes and patterns. The different marking fibers of the turf of the present invention define: (i) one or more characters including numbers and letters; (ii) a character having a border around it; (iii) a plurality of parallel lines; (iv) a dashed line; (v) a plurality of parallel lines and a plurality of intersecting lines perpendicular to the parallel lines; (vi) a plurality of chevrons; (vii) a plurality of parallel lines disposed at an angle relative to a side of the area; (viii) a plurality of checkered four sided shapes; (ix) one or more arrows; and (x) an arrow adjacent to a character.

59 Claims, 17 Drawing Sheets

U.S. PATENT DOCUMENTS

| | | | |
|---|---|---|---|
| 4,047,491 | A | | 9/1977 | Spanel et al. |
| 4,216,735 | A | | 8/1980 | McDaniel, Jr. |
| 4,755,401 | A | * | 7/1988 | Friedrich et al. |
| 4,948,116 | A | | 8/1990 | Vaux |
| 5,205,068 | A | | 4/1993 | Solomou |
| 5,206,058 | A | | 4/1993 | Fry et al. |
| 5,392,723 | A | | 2/1995 | Kaju |
| 5,439,968 | A | | 8/1995 | Hyche |
| 5,932,357 | A | | 8/1999 | Coates et al. |
| 6,039,767 | A | | 3/2000 | Boyes et al. |
| 6,216,389 | B1 | | 4/2001 | Motz et al. |
| 6,227,989 | B1 | * | 5/2001 | Reid |
| 2002/0028307 | A1 | * | 3/2002 | Prevost |

OTHER PUBLICATIONS

LD&A, *Precision Approval Path Indicator System*, www.iesna.org, Jul. 1998 (3 pages).

U.S. Department of Transportation, Advisory Circular, *Standards For Specifying Construction Of Airports*, Feb. 22, 1999 (8 pages).

Airport Technology R & D Branch, *Evaluation of Fiber Optic Runway Distance—Remaining (RDR) Signs at Pittsburgh Int'l Airport*, www.airportech.tc.faa.gov, Feb., 2000 (1 page).

U.S. Department of Transportation, Advisory Circular, *Standards For Airport Markings*, Dec. 1, 2000 (25 pages).

Affidavit of James A. Greif dated Jan. 31, 2003.

Airport Technology R & D, Branch *Airport Markings Paint and Bead Durability*, www.airporttech.tc.faa.gov, printed Mar. 25, 2003 (2 pages).

Control–problem Accidents. Commercial Jet Transport Aircraft 1958–1993. Flight Safety Digest, Dec. 1994.

Surface Safety: Everyone's Responsibility. Federal Aviation Administration, Publication No.: 003099.pm, no date.

* cited by examiner

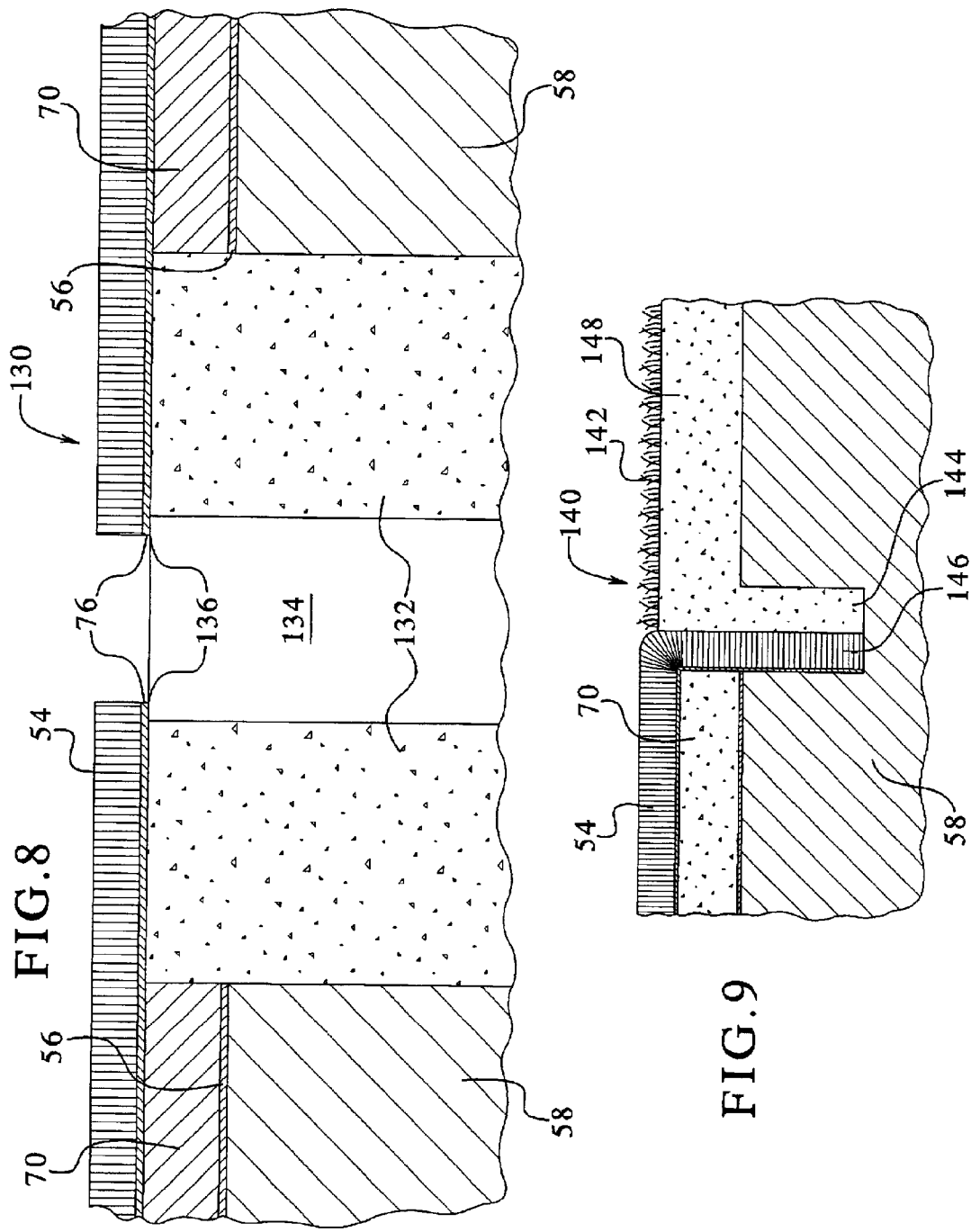

ARTIFICIAL TURF AIRPORT MARKING SAFETY SYSTEM

This application is a continuation-in-part application of U.S. patent application, Ser. No. 09/727,276, filed on Nov. 30, 2000, now U.S. Pat. No. 6,620,482 entitled Safety System for Airports and Airfields.

DESCRIPTION

The present invention relates in general to a safety system for airports and airfields, and more particularly to a synthetic turf system for enhancing runway and taxiway markings.

BACKGROUND OF THE INVENTION

Airfields, including military airfields, small airfields and large commercial airports presently have grass surfaces adjacent to the airport runways and taxiways. These natural grass surfaces are difficult, time consuming and expensive to maintain and are not aesthetically pleasing. More importantly, the existing grass surfaces create potential safety problems for departing and arriving aircraft. The existing grass surfaces also create potential safety problems relating to the clean-up of hazardous waste spills and to the use of pesticides and herbicides necessary for proper upkeep of the grass.

One further problem with natural grass surfaces at airports or airfields is improper water drainage. In typical natural grass installations, the surface of the soil is approximately at the same height as the concrete (or other) surface of a runway or taxiway. The height of the grass thus normally extends past the height of the runway or taxiway surface. Grass clippings, dust, dirt and debris blown across the runway or taxiway, catch the overextending lip of grass and collect adjacent thereto, creating a more extensive vertical barrier. The clippings, dust, dirt and debris trapped adjacent to the runway or taxiway increase the potential of "foreign object damage" or "FOD" to airplanes and are therefore classified as "FODS." FODS are any foreign object that can damage a stationary or moving aircraft, specifically including a turbine engine.

The collected clippings, dust, dirt and debris along the edge of the runway or taxiway also inhibit proper water drainage from runways or taxiways. This build-up also traps and pools rainwater that contacts the runway or taxiway and drains to their sides (i.e., down their grade). The water eventually drains into and through the build-up and often creates a three to four foot (30 to 40 cm) area of wet mud adjacent to the runway. The grass in this area often dies, the mud dries and the top soil erodes so that new grass seed cannot effectively form a root system. Grass sod directly adjacent to a runway or taxiway can become loose, fly up and become a FOD, so that airports are effectively stuck with eroded soil in safety areas adjacent runways or taxiways.

Commercial airports (and certain other airports) must include graded surfaces adjacent to airport runways and taxiways capable of handling a hundred year flood. A conventional grade for such surfaces is a drop in height of at least one quarter inch (0.62 cm) for every foot (30 cm) in a direction perpendicular to the runway, or approximately a two percent drop. Over time, the flow of water carrying dirt and debris away from the runway or taxiway erodes the grade, at least at certain points, in the natural grass surfaces adjacent to the runway or taxiway. Water tends to pool in such areas of the natural grass where the grade is eroded. The pooled water also kills the grass and creates muddy areas where little grows. The muddy areas are aesthetically displeasing and conventional vehicles such as sanitation trucks, maintenance trucks and emergency vehicles cannot travel on or over the muddy areas, if necessary.

In dry, desert like climates, sand adjacent to runways and taxiways also creates problems. Little grows in sand, which leaves the airport with the unenviable choice of either planting, irrigating and maintaining an expansive and expensive natural grass surface or exposing large areas of aesthetically displeasing sand. Conventional vehicles such as sanitation trucks, maintenance trucks and emergency vehicles also cannot travel on or over the areas having sand, if necessary. Windblown sand can also be a dangerous FOD, which in certain instances has been known to sand blast the inside of a jet's turbine engine.

As mentioned above, both wet and dry climates in combination with natural grass adjacent to airport runways and taxiways create potential safety problems; namely, through the creation of FODS and by potentially limiting access to and from the runway or taxiway. Natural grass is also expensive to upkeep. In peak periods, some airport operators must mow twice a week. Weeds, high grass, muddy areas and other obstructions collect litter and debris intermittently over the entire airport or airfield. For example, Los Angeles international Airport currently maintains full time employees whose primary responsibility is to collect litter and trash from the runways and taxiways and adjacent safety areas.

Although airfields are noisy and frequented by large, fast moving jet-powered aircraft, they still tend to support wildlife. Airfields often cover large expanses of open natural grass field surrounded by fences, providing good visibility and a haven for birds and other animals from man and pets. Man-made retention basins and drainage ditches provide a convenient source of free standing water. Mowing machines leave behind mowed straw and the like for nest construction and shattered seeds and maimed insects for food.

Another well known and potentially dangerous safety problem furthered by natural grass are birds and other animals. Many birds including gulls, waterfowl, raptors such as hawks and other species flock to airfields to eat, drink and reproduce. Birds eat insects and grubs which live in natural grass up to six inches (15 cm) below the soil surface. Birds also eat rodents, which feed on the insects. Standing water, especially after fresh rains, attracts many species of birds, including waterfowl. Large birds such as ducks or geese also create especially dangerous conditions for aircraft and are classified as FODs. Natural grass further provides materials and cover for birds to nest and breed.

Many airports and airfields report collisions between airplanes and birds and other animals that have the potential to damage an airplane. In July 1998, a Boeing 757 struck a hawk while ascending from Dallas Fort Worth airport. The plane ingested the bird into its left engine, tower personnel reported flames coming out of the engine and the plane landed safely. In May 1998, a Boeing 767 struck two Canadian Snow Geese while departing John F. Kennedy International Airport. The plane landed immediately with a damaged No. 2 engine and a hole in the right flap. In the same month, a Boeing 727 struck Canadian Snow Geese while ascending from Colorado Springs Metro Airport destroying one engine, cracking the plane's radome and causing $1.4 million in damage to the plane. Also in the same month, an F-16 struck white pelicans near Ainsworth, Nebr., which penetrated a windscreen and caused the pilot to eject.

In April 1998, an MD-80 struck geese ascending from La Guardia airport in New York. The geese destroyed the plane's radome. The plane had airspeed problems and had to divert to and land at Newark airport. In the same month, a Boeing 737 struck a bird while ascending from Dane County Wisconsin Regional airport, damaging an engine and causing a precautionary landing. In March 1998, a Boeing 727 struck a bird on takeoff causing major engine damage and a runway to be closed to remove engine fan blades. In the same month, a Merlin 4 struck a bird on approach to Denver International, the pilot took glass to the face but landed safety. In February 1998, a Cessna Citation flew through a flock of gulls in Watsonville, Calif., which damaged its fuselage windows, an engine and several wing panels.

In January of 1998, a bird struck a Boeing 737 while leaving Salt Lake City International and damaged the plane's No. 1 engine. In that same month, snow geese forced the emergency landing of a Boeing 727, damaged an engine, tore the radome and pilot tube from the aircraft and damaged both leading edges of the airplane's wings. Also in that same month, a Cessna Citation hit a deer during rollout at Horse Shoe Bay Airport in Texas, puncturing a fuel tank and spilling 200 gallons of fuel. In September of 1995, a bird air strike caused the crash of an E-3 AWACS aircraft at Elmendorf AFB, Ala. In June 1995, a Concorde on final approach to John F. Kennedy International airport struck several geese, which destroyed two engines.

The problems created by birds are exacerbated by the variety of birds. Often times eliminating one target species welcomes the arrival of another. For example, allowing grass to grow longer to discourage waterfowl promotes the rodent population, which in turn promotes the population of rodent eating birds. Known Bird Aircraft Strike Hazard plans, known as "BASH" plans, are trade-off creating methods that require constant adjustment. For example, airports can have a problem with gulls during winter months and smaller flocking birds in the summer months. If an airport produces known bird distress calls in its BASH program, the airport may have to produce gull distress calls in the winter and, for example, blackbird distress calls in the summer.

Birds are not the only species hazardous to airplanes and airports or airfields. Deer, usually in excess of one hundred pounds, and usually active after dark, can cause substantial damage and create potentially dangerous situations for pilots. Planes have been known to hit coyotes, which are attracted to areas having a large rodent population. Woodchucks and prairie dogs gnaw through underground wiring. Beavers can dam drainage ditches and flood airfields. An abundance of worms or other grubs on a runway, especially after a heavy rain, can also create a dangerous situation for planes taking off and landing.

Known animal, pest and BASH programs are either expensive, time consuming or illegal and in most instances do not solve all of the problems. One known solution is to employ a propane cannon. As stated above, airfields are already noisy, so that birds and other wildlife become accustomed to loud noises. Propane cannons also require active management. Live ammunition in combination with propane cannons is more effective, but live ammunition may not be legal, requires active management and is inherently dangerous.

Pyrotechnics (i.e., industrial or agricultural fireworks including shellcrakers, bird bombs and screamer sirens) are relatively effective and have been authorized for purchase by the United States Air Force. Such techniques, however, require active management including proper placement. They are generally not audibly pleasing to humans and do not provide an acceptable solution for unknowing passengers taking off or landing in a commercial jet.

U.S. Pat. No. 5,986,551, entitled "Method and System for Preservation Against Pesky Birds and Pest Animals", issued on Nov. 16, 1999. The patent generally discloses a method and system for eliminating birds. The disclosure employs rotating-hunters and falcon imitators and requires sequentially, actively agitating the hunters or falcon imitators, removing all nests from an area that a system user desires to purge, and actively agitating the hunters or falcon imitators again. This is followed by a lessened, intermittent and protracted agitation.

Known hazing techniques such as loud noises and moving scarecrow type figures may provide a temporary solution. Hazing techniques at best only temporarily move birds and animals from one part of the airport to another, whereby the birds soon become habituated to the hazing and return. Each of the hazing systems requires active management, including proper placement and adjustment and has the drawback that whatever apparatus is in place to scare the birds or animals may also scare consumer airline passengers.

Runway incursions present another significant safety problem for airports and airfields. The Federal Aviation Administration ("FAA") defines a "runway incursion" as, "any occurrence at an airport involving an aircraft, vehicle, person, or object on the ground that creates a collision hazard or results in loss of separation with an aircraft taking off or intending to take off, landing, or intending to land." A "collision hazard" is defined as any "condition, event or circumstance which could induce an occurrence of a condition or surface accident or incident (e.g., a pilot takes an unplanned or evasive action to avoid an aircraft, vehicle, object, or person on the runway)." "Loss of separation" includes "an occurrence or operation, which results in less than the prescribed separation between aircraft, vehicles, or objects." For definitions, see:

http: //www.faa.gov/runwaysafety/, under statistics and data.

The FAA places runway incursions into three general causal categories, namely: (i) a pilot can cause a pilot deviation ("PD"); (ii) a tower controller can cause an operational error ("OE") runway incursion; and (iii) a person or vehicle on a runway or taxiway can cause a vehicle/pedestrian device ("V/PD") runway incursion. Calendar year 2000 also had one miscellaneous incursion. The total number of runway incursions has steadily risen from 187 in year 1988 to 429 in the year 2000. The proportion of PD related incursions has also risen from 68 out of 187 in 1988 to 256 out of 429 in the year 2000.

Runway incursions have led to serious accidents. In 1994, a DC-9 collided with a Cessna 441 upon departure. The Cessna 411 mistakenly taxied past its assigned runway and onto the DC-9's runway. The tower controller cleared the DC-9 for take-off. The DC-9 impacted the Cessna 411 upon taking off. Recent serious runway incursions, such as one near collision of two 747 jumbo jets at Chicago's O'Hare International airport on Apr. 1, 1999, led the U.S. National Transportation and Safety Board ("NTSB") to issue new air traffic safety procedures.

Skeptical that any technological solution will soon solve the increasing occurrences of runway incursions, the NTSB recommends that pilots be told to stop before crossing any active runway and wait until an air traffic controller gives permission to cross. The NTSB recommends that pilots wait for specific clearances rather than rely on implied clearances and that 14 Code of Federal Regulations ("CFR") Section 91,129(i) be amended to reflect these changes.

The Aircraft Owners and Pilots Association ("AOPA") stresses that pilot education and information are the key to reducing runway incursions. One cause of the problem is that the complex instrument panels in many airplanes cause pilots to be "heads down" for substantial periods of time. When a pilot is "heads down," it is more difficult for the pilot to know the plane's exact position on the runway or taxiway. One of the easiest and most effective solutions to the increasing problem of runway incursions is to educate pilots on the airport layout. Pilots should be able to taxi to and from an active runway without getting lost. Moreover, when pilots do look out their windows, airport markings should be clean and legible.

Presently, the pavement markings and small upright runway signs placed near runways and taxiways provide limited guidance to pilots, ground crews and tower controllers. The pavement signs fade and chip and do not contrast well against gray pavement. The upright signs are necessarily small, so that pilots, grounds people and tower personnel can have an uninterrupted view of other ground and air vehicles on intersecting and adjacent runways and taxiways.

One possible solution to the problem of runway incursions is to chalk or paint airport markings onto natural grass. However, simply chalking or painting natural grass with airport markings does not provide a viable solution. Mowing natural grass having an airport marking obviously damages or destroys the marking. The marking would likely have to be repainted on a regular basis. Painting natural grass also likely hurts or destroys the grass, requiring new sod, or requiring that the marking be painted onto a different and unfamiliar area of natural grass.

One proposed solution for marking natural grass is disclosed in U.S. Pat. No. 6,048,282 entitled "Line System for Playing Field," which issued issue on Apr. 11, 2000. This reference discloses a system for visually marking a line in a natural grass playing field. The system enables the marking of a permanent line for sports played on natural grass, e.g., to mark out the perimeters of the play area and various boundaries of the game. The system involves cutting a trench in a natural grass surface, laying a suitable strip of synthetic grass having side flaps laterally extending from either side of the strip and anchoring the strip by installing natural grass onto the side flaps, wherein the natural grass also abuts the artificial turf strip.

For many reasons, this sports related system does not provide a workable solution for airport safety applications. This apparatus and method does not provide a workable solution for installing elongated dashed lines, multiple parallel lines or airport markings having rounded edges or complex shapes. Also, a strip or patch of artificial turf between sections of natural grass does not provide enough synthetic surface to accomplish the safety features discussed below. Further, natural grass is not compatible with the subsurface or base as described below.

Accordingly, there is no known solution for providing permanent airport markings on the surface of areas around airport runways and taxiways. A number of references teach machines and apparatuses for making artificial or synthetic turf. However, the hallmark use for synthetic turf has been for sporting events such as football, rugby, soccer, golf, field hockey and baseball. These sports primarily make use of the synthetic turf's resiliency in the face of repeated severe shearing forces and of the turfs relatively low maintenance requirements. Synthetic turf also facilitates indoor stadiums and practice facilities that shield players and fans from harsh ambient conditions. The turf has likewise been adapted for these uses.

For example, U.S. Pat. No. 4,337,283 entitled "Synthetic Turf Playing Surface With Resilient Top-Dressing," issued on Jun. 29, 1982 and discloses a playing surface for athletic games. Referring now to FIG. 1, this patent describes a section of turf used for sporting applications. The sports turf system 10 includes a base 12 that establishes the contour of the playing surface. The base 12 consists of concrete or asphalt pavement, compacted clay and gravel rolled into ordinary dirt. Although not shown, a slight slope or grade in the base 12 is preferable to facilitate surface water drainage.

Sports applications employing synthetic turf 14 have included a moisture barrier 16, such as a polyethylene sheet between 2 and 10 mils thick suitably adhered to the base 12. This reduces water penetration and protects the base from substantial ground moisture. Sport applications typically employ a turf 14 that includes a tufted or knitted pile fabric backing 18, such as woven polypropylene. A multi-filament or fribulated yarn 20 made from, e.g., ⅜ inch (0.93 cm) wide polypropylene ribbon five mils thick, which is slit and twisted to form a plurality of thin filaments or synthetic grass blades 22, is tufted or stitched through the fabric backing. If the yarn 20 is fribulated, the thin filaments 22 remain connected at certain points so that the yarn when stretched apart creates a honeycombed mesh. Known strands of yarn 20 can comprise from twenty to fifty or more individual filaments 22.

Typical tufts or stitches include three to eight multi-filament yarns 20 per inch (2.5 cm) on conventional carpet tufting or stitching machines. The height of the yarn filaments 22 (i.e., grass blades) can vary but is typically between ½ inch to 2 inches (1.25 to 5 cm) high. The machines typically produce rows of tufts that are commonly ⅜ inch to ¾ inch (0.93 to 1.87 cm) apart.

Tufting or stitching different types of yarns into a standard carpet by threading different yarns into a plurality of laterally aligned needles is well known. For example, in a high-low technique, the carpet machine at predetermined times is fed shorter yarns to produce a shorter pile height. Taller pile heights of a different yarn, adjacent to the shorter pile heights, cover the shorter pile heights. The machines and methods for performing the high-low technique are disclosed in U.S. Pat. Nos. 3,016,029, 3,067,701, 3,272,163, 3,433,188, 3,435,787 and 4,216,735.

Other machines select different yarns according to a predetermined pattern. The pattern driven machines are disclosed in U.S. Pat. Nos. 3,056,364, 3,117,833 and 3,547,058. One carpet machine specifically adapted to tuft complex designs into carpets is disclosed in U.S. Pat. No. 5,392,723. It should be understood that while these patents teach methods and apparatuses for tufting or stitching various patterns into a carpet, none of these patents disclose or suggest a machine or method for making artificial turf. None of these references address airports, airport safety or runway incursions.

The underside of the pile fabric backing 18 can be coated with a resinous coating 24 that secures the tufts in place. The coating 24 increases the dimensional stability of the backing 18 as well as the moisture resistance of the backing 18. A preferred manner of coating the backing 18 is to contact the back of the pile fabric with a solution of vinyl polymer in a volatile, non-aqueous solvent and then subject the pile fabric to a heat treatment to evaporate the solvent and cure the vinyl polymer coating. Conventional polyvinyl chloride, polyvinyl acetate or natural or synthetic rubber latex coatings can be employed. The resinous coating 24 is sometimes referred to as a secondary backing and can also be considered a moisture barrier. In sport applications, it may then be possible to omit the moisture barrier 16 if the pile fabric backing 18 is provided with a suitable resinous coating 24.

In sports applications, after laying and adhering the synthetic turf 14 to the base 12, turf installers typically infill or infuse a layer 26 of compacted material having a mixture of resilient particles and fine sand between the synthetic grass blades. Turf installers have been known to use a variety of different resilient materials, such as: (i) granulated cork; (ii) rubber particles including natural rubber or synthetic rubber; (iii) beads of synthetic polymers such as vinyl chloride, vinyl ethers, vinyl acetate, acrylates and methacrylates, polyvinylidene chloride, urethanes, polyamids and polyesters; (iv) synthetic polymer foam particles; (v) vinyl foams such as polyvinyl chloride foams, polyvinyl ether foams, foamed polystryene, foamed polyurethanes and foamed polyesters; and (vi) foamed natural rubber.

Turf installers often utilize or mix two or more of the above mentioned resilient materials and can also add plasticizers, antioxidants and antistatic agents. Turf installers also preferably add fine sand to the infill to fill the interstices between the resilient particles to thereby form a more densely compacted infill layer 26. In sports applications, the sand is generally smaller in size than 30 U.S. screen mesh size and is preferably between about 40 and 200 U.S. screen mesh size. Fine sand also feels less abrasive to players when they contact the turf 14.

In typical sports applications, the turf installer provides an infill layer 26 from about fifty percent of the height of the synthetic grass blades 22 to substantially even with the top of the synthetic blades. In sports applications, turf installers typically prefer a projection of a synthetic blade between ⅛ inch and ⅜ inch (0.31 and 0.93 cm) above the infill layer. Turf installers maintain an infill layer 26 substantially to the top of the synthetic blades 22 to prevent a playing surface from having a noticeable grain. Normally, the synthetic grass blades 22 have a characteristic grain (i.e., a tendency to lay in a given direction related to the direction in which the material passed through the production machinery). The infill layer 26 counteracts this tendency and prevents the playing surface from having an easily noticeable grain.

A relatively high infill layer 26 that includes resilient materials also absorbs much of the shock of an object impacting the playing surface and improves the footing of a player running or walking across the surface, particularly when making cuts or sharp turns. The non-abrasive character of the infill and the controlled and diminished synthetic blade height projecting above the infill make a playing surface much less likely to produce rug burns or abrasions when players contact the surface.

To look like grass, the polypropylene yarn is died green. While synthetic turf has made use of a green dye, other applications of polypropylene employ different colors. Certain references therefore disclose dyes and methods for dying polypropylene. In the early 1990's, Lyondell Petrochemical Company developed an enhanced dyeable polypropylene disclosed in U.S. Pat. Nos. 5,468,259, 5,550,192 and 5,576,366, which is marketed under the KROMA-LON™ mark. Similarly, U.S. Pat. No. 6,039,767, assigned on its face to Equistar Chemicals, LP, entitled "Blended Dyes and Processes for Dyeing Polypropylene Fiber," discloses an improved method of dyeing polypropylene and dyes therefore.

U.S. Pat. No. 6,039,767, assigned on its face to Eastman Chemical Co., entitled "Fluorescent Pigment Concentrates," discloses a fluorescent die suitable for coloring plastics. U.S. Pat. No. 5,206,058, assigned on its face to Eastman Kodak Company, entitled Process for Painting Polypropylene, discloses a plurality of methods for painting polypropylene, which include: (i) using an adhesion promoting composition as a separate primer coating between polyolefin (polypropylene) substrate and the paint; and (ii) using an adhesion promoting composition as an additive to the paint. It should be appreciated that these references do not disclose or suggest using dyes or paint for artificial turf, do not mention airports and do not address airport safety.

SUMMARY OF THE INVENTION

One aspect of the present invention involves an artificial turf system for areas, and primarily safety areas, adjacent to airport and airfield runways and taxiways. This system includes an aesthetically pleasing artificial turf that repels birds and other animals and an accompanying sub-surface, which enhances water drainage and facilitates the accessibility of airport vehicles to all parts of the runway or taxiway. The present invention preferably replaces existing natural grass as well as an application specific volume of soil or other material beneath the natural grass in target areas adjacent to and around airport runways and taxiways.

The present invention also applies to new airport or airfield installations, wherein the system employs an existing graded and/or compacted surface without additional excavation and/or compaction or natural grass replacement. The present invention uses an application specific form of known artificial turf, which includes plastic, such as polypropylene or polyethylene, or otherwise synthetic fibers slit or fribulated to appear grass-like. One embodiment of the present invention employs an application specific artificial turf, which includes the artificial or synthetic fibers and stiff fibers or repelling fibers otherwise uncomfortable for certain species to contact, walk on or lay on.

Beneath the artificial or synthetic turf, the present invention includes a sub-surface having an animal and plant retarding base, such as rock, crushed rock or concrete. The rock is preferably compacted to eliminate as much air as possible from between the rocks, to create a hard and stable surface. The base is thus able to support the weight of an aircraft or airplane. That is, the base at least supports the weight of small aircraft in small airfield applications and preferably supports the weight of any large aircraft or airplane in commercial or military airport applications. In this application, "aircraft" and "airplane" are used interchangeably. Both terms include all aircraft and all airplanes.

By removing the top soil and natural grass and replacing them with compacted rock and artificial or synthetic turf, the present invention substantially limits the plant and animal life that can or desires to exist in the target areas. The present invention virtually eliminates grubs or insects that live on the surface or below the surface to a depth of approximately six inches (15 cm). The lack of natural grass, grubs or insects virtually eliminates rodents and other small animals that live in the natural grass and eat the grubs and insects. The lack of natural grass, grubs, insects, rodents and other small animals virtually eliminates all food sources for birds, which provide the greatest potential danger to aircraft. The present invention likewise eliminates virtually all food sources for other animals including deer, coyotes, etc.

The lack of natural grass, the ability to grow natural grass and the need to mow natural grass, which creates clippings convenient for nesting purposes, eliminates the cover and materials necessary for birds and other animals to nest and/or reproduce. The lack of natural grass also reduces the amount of environmentally unfriendly herbicides or pesticides that airport or airfield operators have to apply.

The present invention further includes a plurality of water drainage mechanisms to produce a target area near airport and airfield runways or taxiways substantially free from standing water or wet areas. Specifically, the present invention provides a layer of infill, which is primarily sand, between the synthetic fibers, that sufficiently absorbs water and provides a first line of defense against standing water. For heavy rains, the present invention enables water to drain through the artificial turf of the present invention into a sub-surface retention area. The system includes additionally grading the soil surface, creating the positive drainage necessary to eliminate standing water. The sub-surface of the present invention includes water sheeting layers or mechanisms, such as a waterproof membrane, to enable water to drain across the top of the turf leading into pipes or larger drains.

Removing standing water eliminates muddy or dead areas that currently proliferate at airports, resulting in a uniform, year round surface. The lack of available water eliminates another attraction for birds and other animals. A substantially dry surface in combination with a stable, compacted base also enables any type of airport vehicle to reach any part of the runway or taxiway at any time of the year, if necessary, subject only to extraneous conditions. The lack of mud around standing water reduces the likelihood of mud reaching the runway or taxiway and becoming a FOD.

The present invention further preferably includes installing the artificial turf, so that the grass tips of the turf are substantially even with or below the surface of the runway or taxiway, and so that grass clippings (from areas not employing the present invention), dust, dirt and debris can blow across the runway or taxiway unimpeded by undesirable obstructions as a result of grass growing above their surfaces. Such debris can blow all the way to an airport fence, unimpeded by weeds or mud, which facilitates easier and more cost effective waste removal. The transition or distance from the runway or taxiway surface to the top surface of the synthetic turf backing also enables a positive water drainage from the runway or taxiway to the turf.

The artificial turf of the present invention requires less maintenance, i.e., an occasional vacuuming of airborne soil and other materials that has collected on the turf of the present invention, which can lead to a limited germination of seeds. The turf may also require limited spraying of herbicides or pesticides if weeds begin to grow. The turf of the present invention preferably includes polypropylene fibers representing grass blades, a woven polypropylene backing into which the fibers are woven, a polyurethane backing and a pure sand infill. Each of these materials absorb hazardous material spills, such as jet fuel, and are readily replaceable without exposing large areas of bare dirt near a runway or taxiway. Each of these materials also retards and reduces a fire, such as that related to a fuel spill or other incident.

Another aspect of the present invention involves a system for areas near the ends of airport runways which includes an aesthetically pleasing artificial turf that covers and forms part of a soft ground arrester bed for slowing the motion of a runaway aircraft. The arrester bed system includes all the drainage features, aesthetics, ease of maintenance and accessibility of the artificial turf system described above.

The arrester bed system employs a deeper base than the artificial turf system, and the base of the arrester bed system preferably includes rolled rather than crushed rock, to soften the shock of an impacting plane and to absorb its kinetic energy. The arrester bed system also includes a turf area extending from the end of the runway a sufficient distance, preferably, on the order of a thousand feet (300 m), while the artificial turf system provides substantial benefits at sufficient distances, on the order of one hundred to two hundred feet (30 to 60 m).

A further aspect of the present invention is to provide a turf that inhibits or repels loitering animals. As illustrated above, the present invention eliminates the attractions for animals including birds to congregate on the artificial turf of the present invention, including eliminating food, water and cover and materials for reproduction. However, certain species, namely seagulls, tend to loiter in areas for no apparent reason. To counteract such loitering, the present invention contemplates using artificial turf having stiff or repelling fibers among the polypropylene fibers, which are uncomfortable to touch, stand on or lay on. The present invention contemplates that the stiff or repelling fibers bother the web-footed seagull as well as animals having paws or hoofs.

Yet another aspect of the present invention includes providing at least one segment, area or portion of a multi-colored or multi-pigmented synthetic turf adjacent to or near airport runways and taxiways. The multicolored turf segments or areas provide a permanent, readily implemented and effective way of communicating with pilots, ground crews, tower controllers and airline passengers. The multi-colored or multi-pigmented turf areas provide an effective tool for decreasing the frequency of runway and taxiway incursions.

The multi-pigmented turf segments include a plurality of differently colored dyed or painted fibers, including fluorescent fibers, which are tufted or stitched into the artificial turf. The multi-colored turf segments also include one or more sections of a differently colored turf section that is cut out and stitched together with a section of a base colored turf, e.g. green. The multicolored turf segments also include placing a stencil over the base colored turf and painting the base turf with one or more colors, in a desired shape or pattern, using suitable paints.

The airport marking system of the present invention includes an artificial turf segment having a backing with base colored fibers and marking fibers securely installed in an airport, wherein the marking fibers define an airport marking. One airport marking of the present invention is adapted to inform a pilot to hold a position before a runway or taxiway. Another marking is adapted to direct a pilot where to move an airplane. A further marking is adapted to inform a pilot of an airplane's current position in the airport. Other airport markings are adapted to define an end of a runway or taxiway. A further airport marking is adapted to define a hazardous parking area. The airport markings therefore include, among others, one or more: (i) runway holding position lines; (ii) taxiway holding position lines; (iii) instrument landing system boundary markings; (iv) holding position signals; (v) direction signals; and (vi) location signals.

The airport marking system of the present invention includes a multicolored artificial turf segment having a backing with base fibers and marking fibers, wherein the marking fibers are visually different than the base fibers. The marking fibers have various colors adaptable to define a plurality of different shapes and patterns. The marking fibers of the present invention define: (i) one or more characters including numbers and letters; (ii) a character having a border around it; (iii) a plurality of parallel lines; (iv) a dashed line; (v) a plurality of parallel lines and a plurality of intersecting lines perpendicular to the parallel lines; (vi) a plurality of chevrons; (vii) a plurality of parallel lines disposed at an angle relative to a side of the segment; (viii)

a plurality of checkered four sided shapes; (ix) one or more arrows; (x) an arrow adjacent to a character; and (xi) combinations thereof.

The multicolored or multi-pigmented turf segments are adaptable to be included in the different safety systems disclosed herein. Namely, one multicolored system includes a base adapted to support the weight of an aircraft and a soil surface beneath the base. An arrester bed system of the present invention includes a multicolored artificial turf segment securely installed in an area of an airport; a base beneath the turf segment, the base adapted to slow a moving aircraft; and a soil surface beneath the base. A multicolored or multi-pigmented artificial turf for repelling animals or birds includes a backing; a plurality of repelling fibers attached to the backing; a plurality of grass-like base fibers attached to the backing; and a plurality of grass-like marking fibers attached to the backing having a second color.

It is therefore an advantage of the present invention to provide an artificial turf system for airports and airfields that retards birds and other animals and has a sub-surface that enhances water drainage and as well as the accessibility of airport vehicles.

Another advantage of the present invention is to provide an artificial turf system for airports and airfields that includes an artificial turf surface and a sub-surface that slows a moving aircraft.

A further advantage of the present invention is to provide an artificial turf adapted to retard or repel loitering animals.

Yet another advantage of the present invention is to provide a multi-pigmented turf which visually defines airport markings, symbols, messages and the like.

Other objects, features and advantages of the invention will be apparent from the following detailed disclosure, taken in conjunction with the accompanying sheets of drawings, wherein like numerals refer to like parts, elements, components, steps and processes.

BRIEF DESCRIPTION OF THE DRAWINGS

FIG. 8 is a fragmentary cross-sectional view, taken along line VIII—VIII of FIG. 2, of one preferred embodiment of the present invention for interfacing the artificial turf and associated sub-surface of the present invention with a drain or other obstruction;

FIG. 9 is a fragmentary cross-sectional view, taken along line IX—IX of FIG. 2, of one preferred embodiment of the present invention for interfacing the artificial turf and associated sub-surface of the present invention with natural grass;

DETAILED DESCRIPTION OF THE INVENTION

Artificial Turf System

Figure 2:
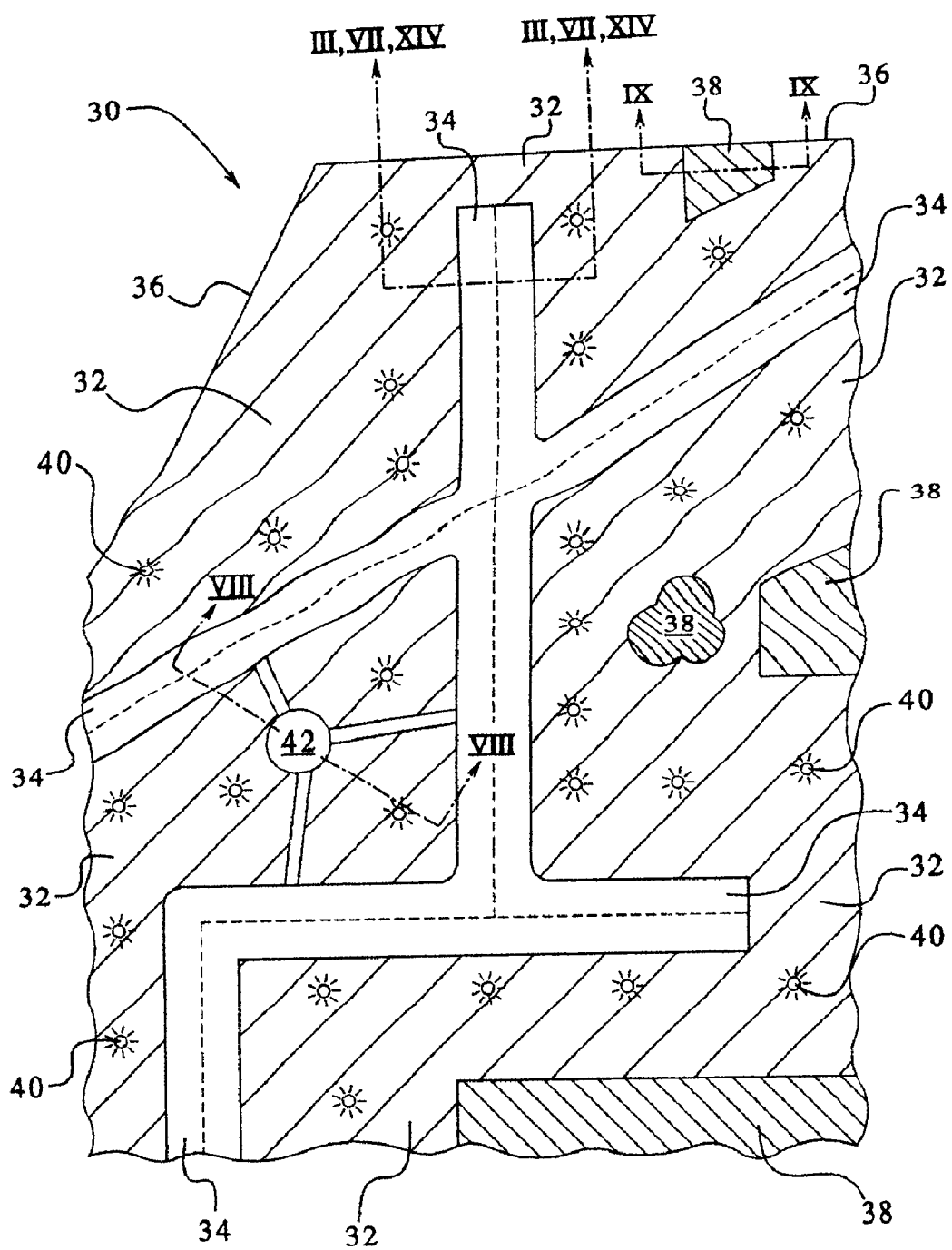
FIG. 2 is a fragmentary top plan view of an airport or airfield, illustrating sections of airport runways, taxiways and areas of adjacent synthetic turf of the present invention.

Referring now to the drawings, and in particular to FIG. 2, an airport or airfield 30 employing the present invention has runways, including taxiways and areas of synthetic turf 32 adjacent thereto. The artificial turf areas 32 are installed adjacent to the runways or taxiways 34 or sections thereof. The present invention contemplates installing the artificial turf areas 32 adjacent to or substantially adjacent to all the runways or taxiways 34. It is possible that certain presently existing runways or taxiways contain obstacles, such as drains, etc., along their side surfaces that do not allow the turf to be uniformly applied directly along their edge or side surfaces. The turf of the present invention, however, is preferably installed adjacent to the runway or taxiway wherever possible.

The artificial turf areas 32 are preferably installed on both sides of a runway or taxiway 34 and their surrounding areas, as desired by the airport operator, builder or maintainer. The greater the artificial turf area 32, the greater the benefit, as described above. However, any substantial turf area 32 produces some benefit. The turf areas 32 are adaptable to be installed to match any shape or contour created by the runways or taxiways 34, airport fences 36, natural grass areas 38 or by any other roads, driveways, accessways, pathways, trees, bushes, buildings, terminals, garages, hangers (not illustrated), or any other structures associated with an airport or airfield. The turf areas 32 likewise are adaptable to accommodate any interior obstruction, such as runway lights 40, interior natural grass sections 38 or other uses (if desired by the airport operator), drains or drainage ways 42, access roads, buildings, garages, hangers (not illustrated), or any other structures associated with an airport or airfield. One preferred interface of the present invention between the turf areas 32 and the natural grass areas 38 is described below.

The present invention includes any turf area 32 having any distance perpendicular to a runway or taxiway 34. It is preferable to have the turf areas 32 perpendicularly extend at least 150 to 300 feet (45 to 90 m) (transversely from the runway or taxiway to ensure a proper bird strike reduction. Many airports contain parallel runways less than 300 feet (90 m) apart. In such cases, it is preferable that the turf areas 32 extend from runway to runway (including from runway to taxiway and from taxiway to taxiway). As illustrated, the present invention contemplates installing the turf areas 32 on both sides of the runways or taxiways 34 and one or more of the runway or taxiway ends. Again, to ensure proper bird strike reduction, the turf is preferably installed 150 to 300 feet (45 to 90 m) perpendicular to the end of the runway or taxiway 34.

Figure 3:
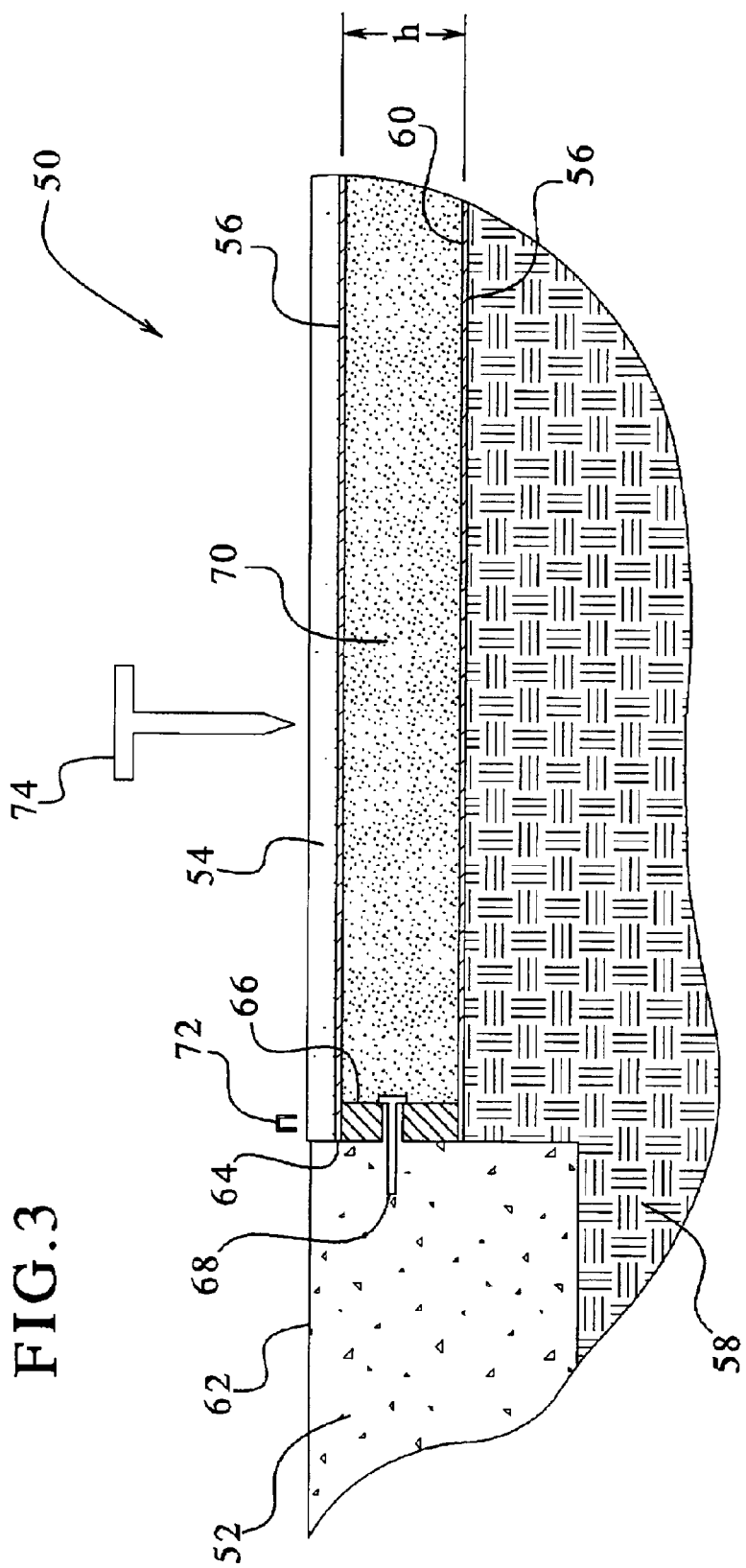
FIG. 3 is a fragmentary cross-sectional view, taken along line III—III of FIG. 2, of one embodiment of the artificial turf system of the present invention illustrating an airport runway section adjacent to an artificial turf surface, which includes a sub-surface having one or more weed barriers.

Referring now to FIG. 3, a fragmentary cross-sectional view, taken along the section line III—III of FIG. 2, of one embodiment of the artificial turf system 50 is illustrated, which includes an airport runway or taxiway section 52 adjacent to the artificial turf 54 and an accompanying sub-surface having one or more weed barriers 56. To install the system 50 of the present invention, an implementor preferably: (i) excavates, grades, scarifies and compacts an application specific amount, volume or depth of the soil 58 to create a desired soil surface 60 (for existing airports and in certain instances for a new airport); (ii) installs a weed barrier 56 onto the soil surface 60; (iii) glues and ramsets a composite stud or member 66 using a suitable non-toxic glue and ramset 68; (iv) installs and compacts to tested specification an application specific amount, volume or depth of base material 70, preferably ¾ inch (1.87 cm) minus crushed rock with binder; (v) installs a second weed barrier 56, and staples (or otherwise suitably attaches or connects) the weed barrier to the top of the composite stud or member 66; (vi) installs a preferred two inch (5 cm) artificial turf by stapling and gluing (or otherwise suitably attaching or connecting) the turf initially to the composite stud or member 66, sewing separate adjacent and interior sections of turf together as necessary, pulling the sewed section(s) taught, and driving pinning devices 74 in a preferred grid pattern to secure the turf before applying infill; and (vii) applying an application specific infill (preferably non-uniform sand) to an application specific height (preferably one inch (2.5 cm) below tips of the turf's grass-like fibers).

More specifically, FIG. 3 illustrates an existing runway or taxiway section 52 imbedded in the existing soil 58. The thickness or depth of airport runways or taxiways varies in accordance with airport or airfield engineering specifications. Many existing runways or taxiways are 18 inches (45 cm) thick or deep. The soil 58 includes a soil top surface 60 that is preferably below a runway or taxiway top surface 62, and which abuts a side wall 64 of the runway or taxiway 52. To aid in the description of the present invention, the term "runway" hereafter refers to a runway, a taxiway or any other road traveled by airplanes.

The present invention contemplates the distance between the runway top surface 62 and the soil top surface 60 at the runway side wall 64 being application specific, but in any application, at least an inch (2.5 cm). Certain applications require more excavation than others. For instance, if the system implementor finds that the soil 58 adjacent to the runway side wall 64 is pure sand, the application may require that the sand be excavated initially to twelve inches (30 cm) below the runway top surface 62 at the wall 64. It is conceivable that the application could require 18 to 24 inches (45 to 60 cm) of initial excavation. The application is limited preferably to the thickness or depth of the runway 52. That is, the system implementor preferably does not dig below or beneath the runway 52.

Most applications require an initial excavation of approximately six to ten inches (15 to 25 cm) of soil at the side wall 64. In a new airport installation, the system implementor alternatively specifies the proper depth and grade, whereby the airport engineers grade the soil surface 60 to the appropriate specifications. For cost reasons, it is not desirable to excavate any deeper than necessary. It should be appreciated from the advantages of the present invention described above, however, that the top of the synthetic turf 54, i.e., the tips of the synthetic grass blades, be approximately even with or slightly below the runway top surface 62 at the wall 64. Also, the present invention preferably includes a suitable base providing structural stability, water absorption and a life retarding environment. The present invention therefore prefers an average initial excavation of six inches (15 cm) of the soil 58 at the side wall 64 of the airport runway section 52.

Although not illustrated in FIG. 3, the soil top surface 60 is preferably graded such that the system 50 enables water to drain away from the runway. In FIG. 3, therefore, water drains from left to right and the soil surface 60 is graded so that the soil is higher near the side wall 64. The grade as well as the depth of excavation is application specific. That is, a particular airport can have a drainage system in place whereby the grade beginning at the runway side wall 64 is much steeper than normal. In such a case, the present invention contemplates working with and preferably enhancing the initial engineering plan and accordingly keeping the original steep grade.

Assuming that the application does not have a drainage system in such proximity to the runway side wall 64, the system implementor preferably grades the soil top surface 60 at approximately two percent. That is, for every foot (30 cm) measured from left to right from the runway side wall 64, the surface level preferably drops ¼ inch (0.62 cm). If possible, the system 50 maintains a constant grade, so that a 150 foot (45 m) application is gradually excavated to approximately three additional feet (90 cm) of soil from the side wall 64 to the end, 150 feet (45 m) away.

Certain airports have been engineered to handle or properly drain a hundred year flood, which requires more or less drainage depending upon the geographic location of the airport. Certain airports have existing retention or detention ponds that may or may not be functioning properly. It is therefore probable that at some distance from the runway, each application of the system 50 is going to include a grade that departs, slightly or radically, from the preferred two percent grade. It is conceivable that the system 50 grades certain areas of the airfield as much as 60% to 80%, or however much is the most beneficial to the airport.

Additionally, the system 50 preferably includes a scarified and compacted soil surface 60. Most surface soil exists at approximately 88 percent compaction. That is, surface soil is comprised of approximately 12 percent air. The system implementor preferably compacts the soil 58 on its surface 60 to between 90 and 97 percent. Before compacting, the present invention contemplates scarifying, i.e., breaking up or roughing up the soil, similar to a rototile. The system implementor preferably scarifies approximately four inches of the unexcavated topsoil 58. Scarification enables better compaction, which aids in providing a firm base.

Suitable scarification equipment is commercially available and well known in the art. For instance, a four-ton double drum roller can be used to compact the soil 58. The system implementor alternatively uses a sheep's-foot compactor, which contains an additional device for stirring up the soil as it compacts the soil.

The artificial turf system 50 preferably includes a weed barrier 56 on top of the soil 58. The system implementor preferably lays the weed barrier onto the compacted soil surface shortly before installing a base material 70, as described in detail below. The weed barrier is a plastic or other fabric, that retards upward weed growth and allows a steady and unimpeded flow of water in the opposite direction, i.e., downward. The weed barrier includes being be woven, thermally bonded or otherwise suitably formed. A preferred thickness is 4 mils. One weed barrier contemplated by the present invention is a Polyspun 350 brand drainage/weed control fabric made by Landmaster Products of Engelwood, Colo.

The weed barrier 56 prevents weeds or other plants as well as grubs or worms from traveling from the soil surface 60 through the remainder of the system 50. The weed barrier 56 also enables the water to flow from the system 50 into the soil 58. The maximum rate of the water flow through the weed barrier 56 is preferably not less than the rate of water flow through the remainder of the system 50 including the synthetic turf 54. The rate of water through standard synthetic turf is 25 to 50 gallons per hour per square foot, which the weed barrier 56 of the present invention is capable of handling. The weed barrier product specified above is believed to handle 300 gallons per minute per square foot.

The weed barrier 56 also functions as a mat or cover that provides stability as the remainder of the system is installed. When the soil 58 is compacted it is in an unnatural condition whereby wind, machinery, workers, etc., can kick up the soil 58, adding air to it and lessening the level of compaction. The weed barrier 56 counteracts the tendency for the soil 58 to decompress by not allowing the soil surface 60 to be easily disrupted. Accordingly, a heavier or thicker weed barrier 56, e.g., ⅛ inch, (0.31 cm) is preferably used in certain installations to provide additional stability on unstable soil.

The artificial turf system 50 includes maintaining an elongated composite stud or attachment bracket or member 66 horizontally mounted or connected to the side wall 64 of the runway 52. The composite stud or member 66 includes being of any suitable size and shape desired by the system implementor. One primary function of the composite stud or member 66 is to establish the depth of the base of the artificial turf 54 and to provide an anchor on which to initially attach the artificial turf 54. Therefore, the correct depth and levelness of the installation of the composite stud or member 66 below the runway surface 62 is important.

For a six inch (15 cm) excavation, preferably a 2 by 4 inch (5 by 10 cm) composite stud or member 66 is installed with the four inch (10 cm) side abutting the side wall 64, leaving room for a desired two inch (5 cm) synthetic turf fiber to be substantially parallel with the runway surface 62 at the side wall 64 as illustrated in FIG. 3. The composite stud or member 66 is preferably synthetic and most preferably a solid, rectangular, recycled plastic bar having low deterioration characteristics. It should, however, be appreciated that the stud or member includes being made of other suitable materials, sizes, shapes having varying methods of construction. The member or stud, for example, further includes a hollow or rectangular tube or a suitable three sided structured beam.

The artificial turf system 50 includes gluing the composite stud or member 66 to the runway wall 64. Both the runway 52 and the composite stud or member 66 are porous, so that when a suitable non-toxic glue, such as a PL400 glue by 3M, sets up, the stud is permanently fixed. The glue permeates both the concrete of the runway and the recycled plastic stud or member 66. The present invention contemplates intermittently driving a plurality of ramsets 68 or concrete nails through the composite stud or member 66 into the side wall 64 of the runway section 52, primarily to hold the stud in place until the glue sets up. Employing such ramsets will minimize or eliminate any damage to the runway. It should also be appreciated that a vibration damping material (not illustrated) could be installed in conjunction with the stud, bracket or attachment member 66 to dampen the runway vibration caused by airplanes and other vehicles.

The artificial turf system 50 includes a base material 70 that characteristically or inherently retards plant and animal life, absorbs water and enables water to drain through to the weed barrier 56 between the base material 70 and the soil surface 60 and provides a firm and stable foundation for the synthetic turf 54. The base material 70 includes any material having such characteristics including, but not limited to: rock, crushed rock, concrete, or any combination thereof. The base material 70 also includes sand in combination with rock, crushed rock or concrete.

The base material 70 is preferably a state approved road base, for example, ¾ inch (1.87 cm) minus road base, which is commonly used in the construction of roads. The system 50 preferably includes installing the road base approved by the state or other regulatory authority wherein the application exists. Each state has an approved road base material, such as ¾ inch (1.87 cm) minus road base. Three quarter inch (1.87 cm) minus road base includes crushed rock and binder, wherein the largest rocks have an average diameter of ¾ inch (1.87 cm). The binder material is smaller fragments of rock including sand sized rock pieces.

After the base material 70 is placed onto the weed barrier 56, it is preferably smoothed and compacted. The system 50 includes compacting the crushed rock base material 70 in a manner similar to compacting the soil surface 60. Those skilled in the art of soil excavation and road base installation commonly compact crushed rock or road base. For example, a four-ton double drum roller can be used to compact the base material 70. The system implementor alternatively or additionally uses a sheep's-foot compactor to compact the base material 70, which contains an additional device for stirring up the base material. Optimally, the system implementor wets down the crushed rock and binder with water while compacting the base material.

The artificial turf system 50 includes installing a crushed rock road base that is tested and found to be compacted to at least 90 percent (i.e., 10 percent air or less) and preferably from 95% to 97% or above. Upon compaction, the dust and smaller rocks of the road base fill the interstices between the larger rocks, creating a very solid stable base that preferably approaches 100% compaction. In this manner, the base 70 is able to support the weight of an aircraft or airplane. That is, the base at least supports the weight of small aircraft in small airfield applications and preferably supports the weight of any large aircraft or airplane in commercial or military airport applications.

The height h of the base material 70 is application specific and is preferably equal to the depth of the excavation along the runway wall 64 less the height of the artificial turf 54, wherein the fiber tips are substantially parallel with or slightly below the runway surface 62 at the side wall 64. In an application involving a six inch (15 cm) excavation and two inch (5 cm) high turf 54, the height h of the base material 70 is thus four inches (10 cm).

Alternatively, if the system 50 employs pure sand or a ¼ inch (0.62 cm) minus crushed stone as a base material 70, in an application having a very stable soil surface 60, the height h includes being as little as ½ inch (1.25 cm). Further alternatively, the height h includes being as deep as 2 feet (60 cm), wherein the system 50 provides for maximum stability and water absorption.

The system 50 includes a second weed barrier 56 installed on top of the base material 70. The system implementor initially staples or otherwise suitably attaches or connects the upper weed barrier 56 to the composite stud or member 66 with suitable fasteners such as one inch (2.5 cm) galvanized staples 72, so that the system implementor can pull the weed barrier taught before laying the turf 54. It should be appreciated that one skilled in the art can suitably fasten the weed barrier 56 to any surface of the composite stud or member 66. Preferably, the weed barrier is fastened to the top of the stud or member 66.

The artificial turf 54, which weighs approximately ten pounds per square foot with a dry infill layer, secures the upper weed barrier 56 onto the base material 70. The upper weed barrier 56 is preferably the same weed barrier that is installed on the soil surface 60 and has the same water flow though capability as does the lower weed barrier 56. The system 50 therefore provides flow through drainage.

The weed barriers could be different for cost saving purposes, where it is contemplated that a more expensive weed barrier is applied on the soil surface 60, wherein weeds are more likely to propagate. Moreover, the system 50 contemplates not providing an upper weed barrier 56 in certain applications. For example, in certain areas, such as North Dakota, the soil is relatively alkaline such that weeds do not tend to grow, and so that an upper weed barrier 56 is not necessary. The system 50 preferably includes a lower weed barrier 56, even in an alkaline soil application, as added protection and to take advantage of the weed barrier's stabilizing effect.

The system implementor employs the flow through system 50 in a geographical area that generally allows the system to dry out. That is, the system 50 absorbs substantial rain and remains stable throughout if the weather eventually allows the system to dry. If the soil 58 becomes saturated from continuous precipitation, the system 50 can become less stable. The system implementor, however, handles such applications by varying the height h and thus the absorption and stability of the system. As stated above, the system implementor can also grade the system 50 to employ an airport's existing water retention and detention systems and thereby lessen the drainage burden on the system. The flow through system 50 is therefore applicable to many applications of the present invention.

The artificial turf system 50 includes a layer of flexible synthetic or artificial turf 54 on top of the upper weed barrier 56 of the system 50. The system 50 includes any suitable commercially available turf including the turf disclosed in connection with FIG. 1. One preferred flexible turf embodiment is described below. As previously described, the height of the fibers or grass-like blades of the artificial turf 54 is preferably substantially even or slightly below or parallel to the runway surface 62 at the wall 64. The top surface of the artificial turf 54 created by the substantially uniform tips of the grass-like fibers thereafter slopes as the soil surface 60 slopes, due to the grade.

The artificial turf 54 is attached section by section, beginning preferably along the runway wall 64 and on top of the composite stud or member 66. It should be appreciated that one skilled in the art can fasten the turf 54 to any surface of the composite stud or member 66. Preferably, the turf 54 is fastened to the top of the stud or member 66. The turf normally comes in twelve or fifteen foot (3.6 to 4.5 m) rolls. Once a section of turf is cut, the system implementor preferably runs a bead or other suitable amount of non-toxic glue along the top of the composite stud or member 66, where the turf 54 is to be installed.

After putting the turf onto the stud or member 66 having the bead of glue, the system implementor preferably staples the turf to the composite stud or member 66, e.g., using suitable fasteners, such as one inch (2.5 cm) galvanized staples 72. The galvanized staples 72 primarily hold the turf in place while the glue sets up. Both the flexible backing of the turf 54 and the composite stud or member 66 are porous, so that when a suitable non-toxic glue, such as a PL400 glue by 3M, sets up, the turf is permanently affixed to the stud. A meshed weed barrier 56 between the stud or member 66 and the backing of the turf 54 enables the glue to flow through the meshes of the barrier and into the porous materials.

The system implementor lays a plurality of sections along the runway wall 64 and on top of the composite stud or member 66 in the above described manner and sews the sections together in a conventional manner, so that the turf becomes one continuous piece. Installing interior sections of flexible synthetic turf 54 also includes sewing a turf section to a currently installed section in a conventional manner. Once a sufficient area of turf is laid down, such as a 50 square foot section, the system implementor preferably drives pinning devices 74 into the system 50, at various points, to pin the synthetic turf 54 and the underlying weed barrier 56 to the base material 70.

Figure 4:
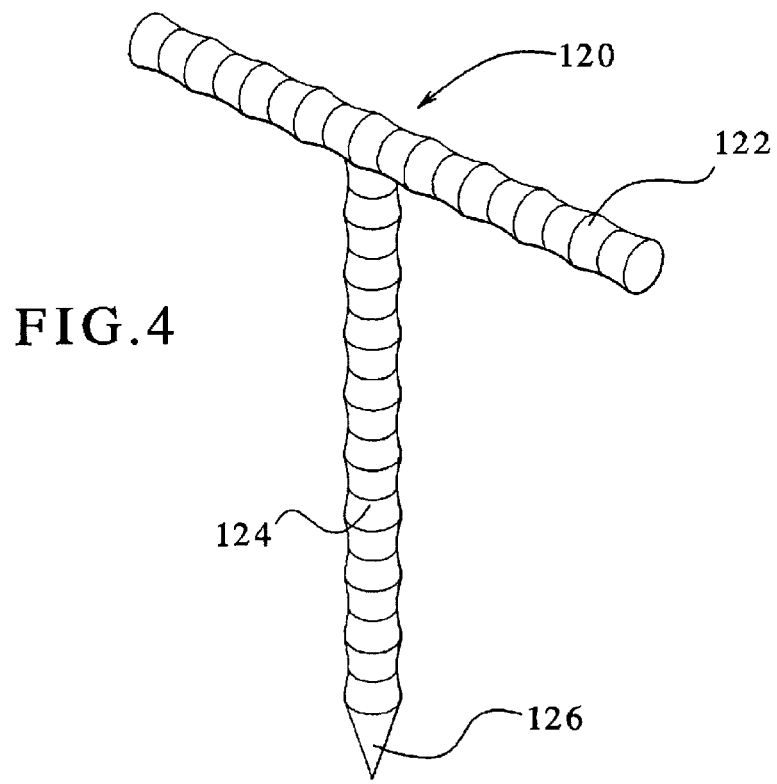
FIG. 4 is a perspective view of a preferred pinning device, which includes a plastic coated steel reinforced T shaped spike having a pointed end to enable penetration of a compacted base material.

Referring now to FIG. 4, a T shaped spike 120 or pinning device used for the present invention is illustrated. The top horizontal section 122 of the pinning device is preferably four inches (10 cm) long although the appropriate length will vary with the installation. The horizontal section 122 is preferably circular in cross-section is preferably ¼ inch (0.62 cm) in diameter although the shape and diameter may vary based on the installation. The vertical spike section 124 is preferably ten inches (25 cm) long although the appropriate length will vary with the installation. The vertical spike section 124 is also preferably circular in cross-section and is preferably ¼ inch (0.62 cm) in diameter although the shape and diameter may vary based on the installation. The pinning device and specifically the horizontal section 122 and the vertical spike section 124 are preferably of steel reinforced bar, which are welded, forged, fastened or otherwise suitably fixed so that one end of the vertical spike section 124 connects substantially to the middle of the horizontal section 122.

The spike 120 preferably includes a plastic coating, such as polypropylene or polyethylene of approximately 4 mils thick to prevent moisture damage and to provide a suitable contacting surface with which to strike and drive the spike 120. A pointed end 126, which preferably includes the bottom ¼ to 2 inches (0.62 to 5 cm) of the spike section 124, is driven into the base material 70. The relatively thick spike 120 and the pointed end 126 facilitate penetrating the compacted base material 70 and preferably the compacted soil 58. The outer surface of the plastic coating of the pinning device is preferably non-smooth, bumpy or irregular (e.g. from a ribbed reinforced bar) to increase the frictional engagement with the base material 70 and soil 58, which prevents vibration from causing the displacement of the pinning device.

The system implementor spaces the pinning devices 74 apart as needed, e.g., in a 6 foot by 6 foot (1.8 m by 1.8 m) grid or in a 10 foot by 10 foot (3 m by 3 m) grid, etc., preferably evenly spacing the pins such that for a 10 foot (3 m) grid and a 15 foot (4.5 m) wide turf roll, the system implementor leaves 2½ feet (75 cm) on either side of two pins spaced 10 feet (3 m) apart. The pinning devices 74 primarily hold the artificial turf 54 taught while the infill is installed and prevent the system implementor from having to tear up infilled turf to smooth out a buckle in the synthetic turf 54. The infill layer is preferably approximately 10 pounds per square foot.

Referring to FIG. 3, many airports such as Los Angeles International Airport and Chicago's Midway Airport have limited runways. The installation of the artificial turf system 50 adjacent to the runway walls 64 may have to take place at night, e.g., from 10:00 PM to 7:00 AM, when air traffic and particularly air passenger traffic is somewhat lighter. In these critical areas, e.g., from the runway to 50 feet (15 m) in any direction, the wind direction can dictate where the system implementers work at any given time. If the wind changes and the planes have to take off in another direction, the airport can order the system implementers out of an area.

The implementor cannot leave exposed dirt, sand or other objects that can become FODs in the critical areas. The implementor will complete or at least cover an area before stopping work in the critical areas. Therefore, it is important not to excavate too much dirt at one time in a critical area. Once the installation extends past the safety area of the runway, e.g., 300 feet (90 m), the implementor can work at any time of the day and lay the turf in the most efficient manner. In each installation, the airport operator preferably schools the system implementor on the airport's regulations and procedures including taxiway incursions that provide access to the installation.

A Preferred Artificial Turf

Figure 5:
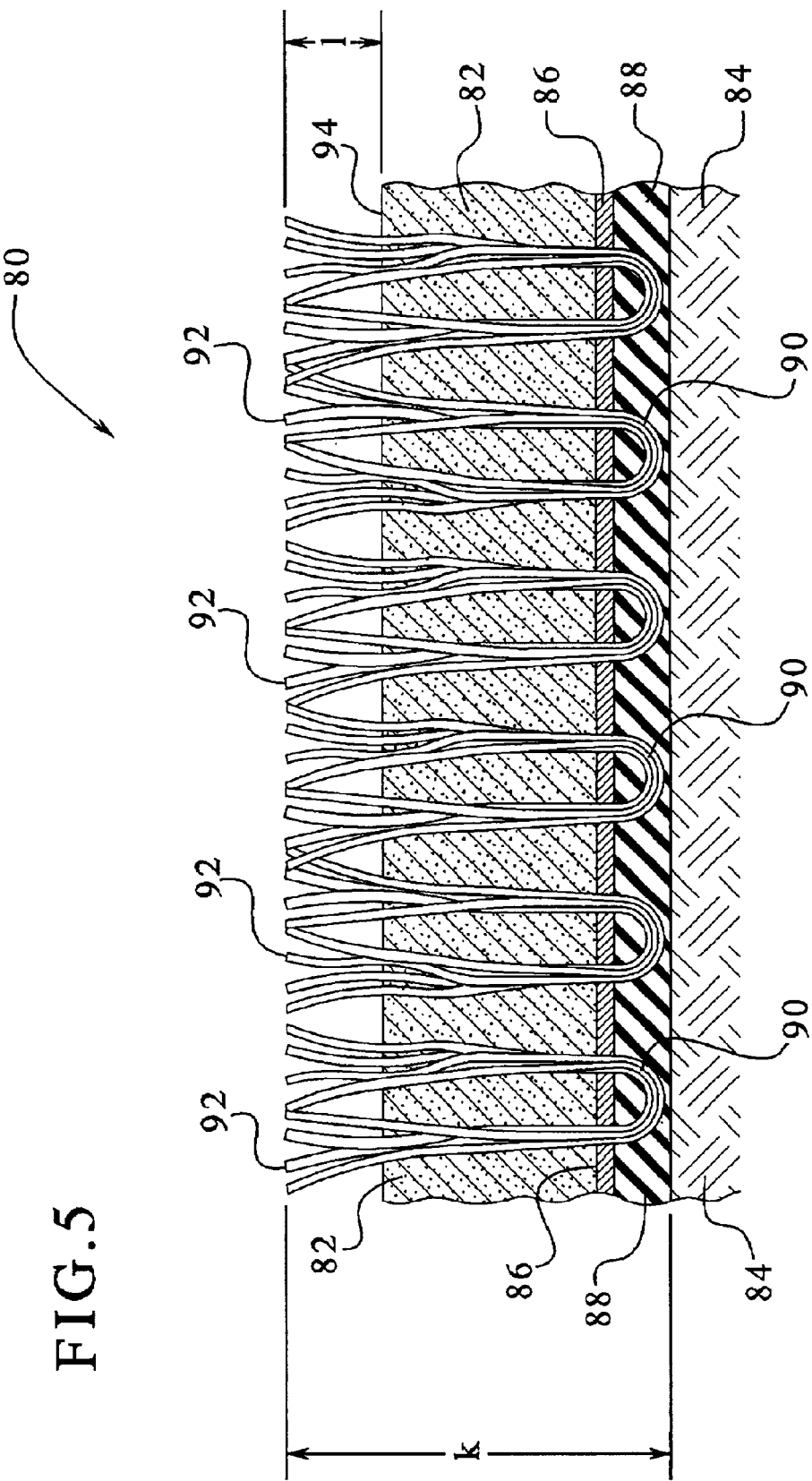
FIG. 5 is a fragmentary front elevation sectional view taken through a preferred embodiment of the artificial turf of the present invention.

Referring now to FIG. 5, an infill layer 82 is illustrated in the preferred embodiment of the flexible turf 80 of the present invention. The preferred turf 80 is preferably laid over a sheet 84. As discussed above in the flow-through embodiment of FIG. 3, the sheet 84 is preferably a weed barrier. In a sheeting embodiment described below, the sheet 84 includes a waterproof membrane. In certain applications, there is no weed barrier or waterproof membrane, in which case the preferred turf lays upon the base material 70. The turf, e.g., a 12 or 15 foot (3.6 or 4.5 m) roll of the preferred flexible turf 80 includes a primary flexible backing 86 preferably of double woven polypropylene and a secondary flexible backing 88, which is preferably polyurethane. The thickness of the primary flexible backing 86 is preferably provided by the manufacturer. The thickness of the secondary flexible backing 88 is preferably between 10 and 20 mils.

The preferred turf 80 includes a plurality of fibers 90, which are tufted or stitched into the primary backing 86. The secondary backing 88, applied after tufting or stitching, covers some or all of the stitch depending on the thickness of the secondary backing 88. The preferred turf includes 19 tufts or stitches per every three inches (7.5 cm). The fibers 90 are preferably fribulated (i.e., separate filaments which remain connected at certain points so that the yarn if stretched apart creates a honeycombed mesh) to form separate grass-like strands 92. The fibers 90 are preferably polypropylene, 7500 denier and 32 ounces per square yard. Polypropylene has superior melting point and wear ability verses other materials, is adapted to be sprayed with pesticides and herbicides, does not degrade upon contact with toxic jet fuel and limits the spread of fire from a fuel spill due to its fire retardant characteristic.

Figure 1:
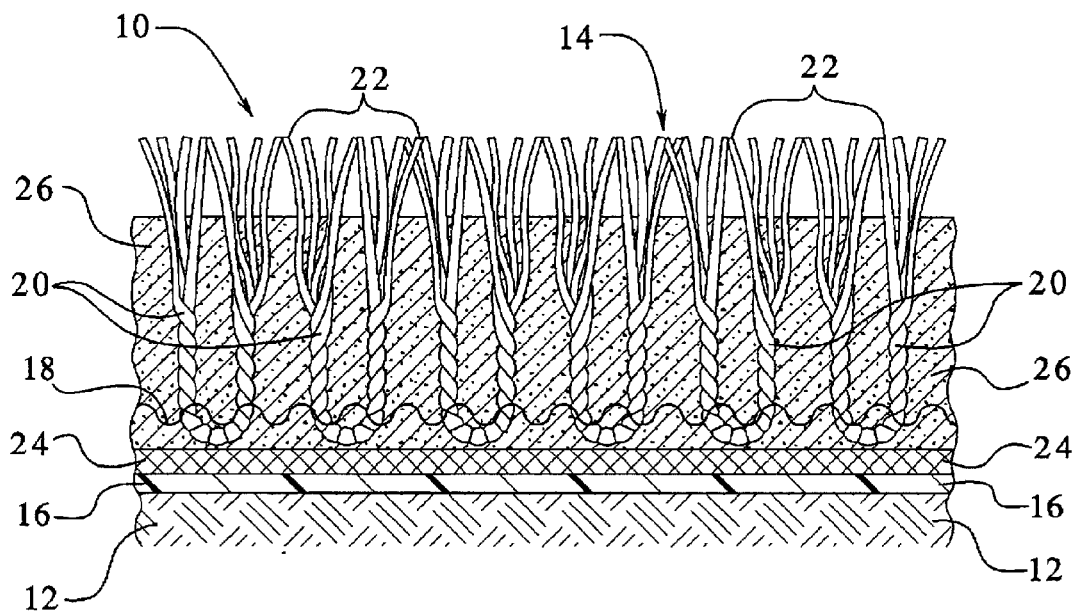
FIG. 1 is a front elevation sectional view through a known section of artificial turf used for sporting applications.

The height of the grass-like strands 92, k, above the bottom of the secondary backing 88 preferably is ½ inch to six inches (1.25 to 15 cm), and specifically 1½ to 2½ inches (3.75 to 6.25 cm) and most preferably 2 inches (5 cm). As illustrated in FIG. 1, the individual fribulated or slit filaments are twisted together near the stitched end and come apart at the top. The preferred turf 80 includes a twisted fiber. Alternatively, the manufacturer makes the fibers 90 flat, so that the individual grass-like strands 92 stack one on top of the other, as illustrated in FIG. 5. The preferred turf 80 includes either style.

The infill layer 82 preferably is a material that characteristically or inherently retards plant and animal life, absorbs water and enables it to drain through to the primary backing 86 and the secondary backing 88 and provides a firm and stable foundation for the fibers 90. The infill layer 82 includes any material having these characteristics including, but not limited to: rock, sand, concrete, plastic, fiberglass, rubber, ceramic material, cork, or any combination or derivative thereof.

The infill layer 82 is preferably crushed rock or sand and most preferably washed sand. In certain instances, e.g., in the rainy Northwest, the infill layer includes being ¼ inch (0.62 cm) minus crushed rock (i.e., ¼ inch (0.62 cm)) average diameter rock down to rock particles) to enhance drainage. Referring to the terminology used in connection with FIG. 1, the infill layer 82 includes resilient materials, such as: (i) granulated cork; (ii) rubber particles including natural rubber or synthetic rubber; (iii) beads of synthetic polymers e.g., vinyl chloride, vinyl ethers, vinyl acetate, acrylates and methacrylates, polyvinylidene chloride, urethanes, polyamids and polyesters; (iv) synthetic polymer foam particles; (v) vinyl foams, e.g., polyvinyl chloride foams, polyvinyl ether foams, foamed polystryene, foamed polyurethanes and foamed polyesters; and (vi) foamed natural rubber. However, the airport application of the present invention does not require the spongy, cushioned impact properties associated with sports turf. Moreover, since rubber (the preferred resilient material in practice) is lighter than sand, it tends to float to the top of an infill layer. The rubber on top of the layer can then become a FOD that is sucked through a jet engine, where it can melt over a sensor.

In sport applications, as disclosed above in connection with FIG. 1, the sand is preferably fine sand between about 40 and 200 U.S. screen mesh size to feel less abrasive to players who contact the turf. The size of the sand in the infill 82 preferably includes bigger sand particles that vary between about 4 and about 70 U.S. screen mesh size. The present invention does not require the sand to be less abrasive and is preferably in a range of sizes, which facilitates better compaction.

The preferred turf 80 includes a compacted infill layer 82 of variable sand particles. The implementor may use a four-ton double drum roller and make one or more passes over the preferred turf 80. The length I, which is the average distance between the tips of the grass-like strands 92 and a top surface 94 of the infill layer 82, is preferably ⅛ to 5 inches (0.31 to 12.5 cm) given that the contemplated variable turf height of the grass-like strands 92, k, above the primary backing 86 includes being ½ inch to six inches (1.25 to 15 cm). The runway (i.e., runway, taxiway or any other road traveled by an airplane) application of the turf preferably projects an inch (2.5 cm) of the grass-like strands 92 above the infill surface 94, wherein the free ends of the strands 92 shield the sand infill 82 from the weather and from any air flow created by a jet or prop engines. Thus, in an application wherein the grass-like strands 92 are preferably two inches (5 cm) high, the infill layer 82 is preferably one inch (2.5 cm) high, leaving a distance I of preferably one inch (2.5 cm). In contrast, sport applications, as described in connection with FIG. 1, preferably fill the turf with as much shock absorbing resilient infill as possible.

Figure 6:
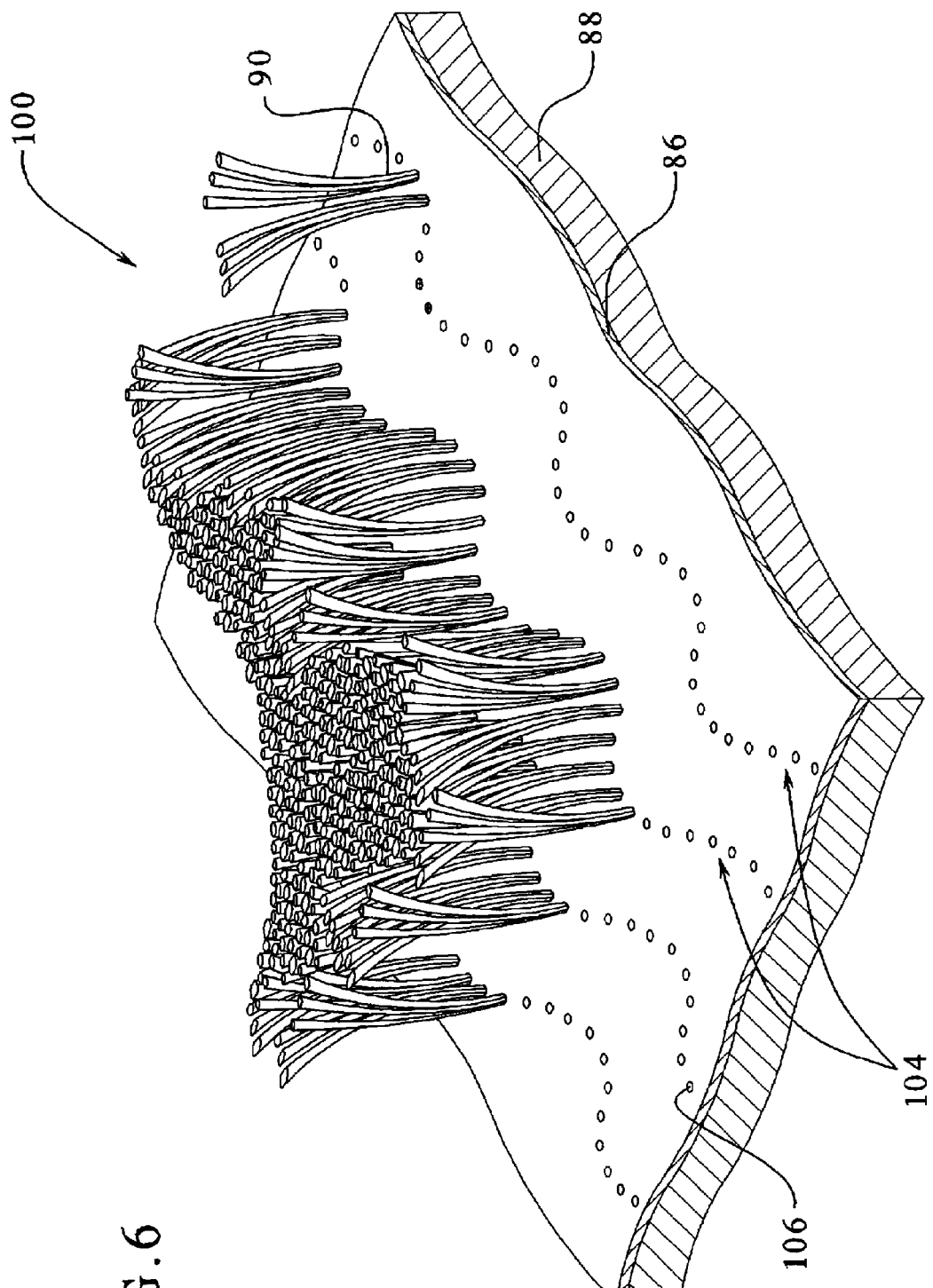
FIG. 6 is a fragmentary perspective view taken through one embodiment of artificial or synthetic turf, wherein a portion of the grass-like fibers is cutaway to illustrate a plurality of rows of stitch holes.

Referring now to FIG. 6, a top-front perspective sectional view through one embodiment of artificial or synthetic turf is illustrated, wherein a plurality of the fibers 90 are cutaway to illustrate a plurality of rows 104 of stitch or tuft holes 106. As above, the turf section 100 preferably includes a primary backing 86 and a secondary backing 88. The rows 104 in this embodiment are alternatingly curved, forming a serpentine shape, to prevent any possible "corn-row" effect from parallel rows. It has been observed that straight rows of the preferred turf described above do not produce a corn-row effect. The present invention therefore includes a turf having alternatingly curved or straight rows.

The rows 104 of the turf section 100 are preferably spaced apart from between ¼ to 2 inches (0.62 to 5 cm), are specifically spaced ⅜ to ¾ inches (0.93 to 1.87 cm) apart and most preferably spaced ¾ inches (1.87 cm) apart. Known stitching machines are set to stitch rows in multiples of ⅜ inch (0.93 cm), so if a system implementor desires a wider row, a row of 1⅛ or 1½ inches (2.81 or 3.75 cm) is likely the most feasible.

Alternative Preferred Artificial Turf System

Figure 7:
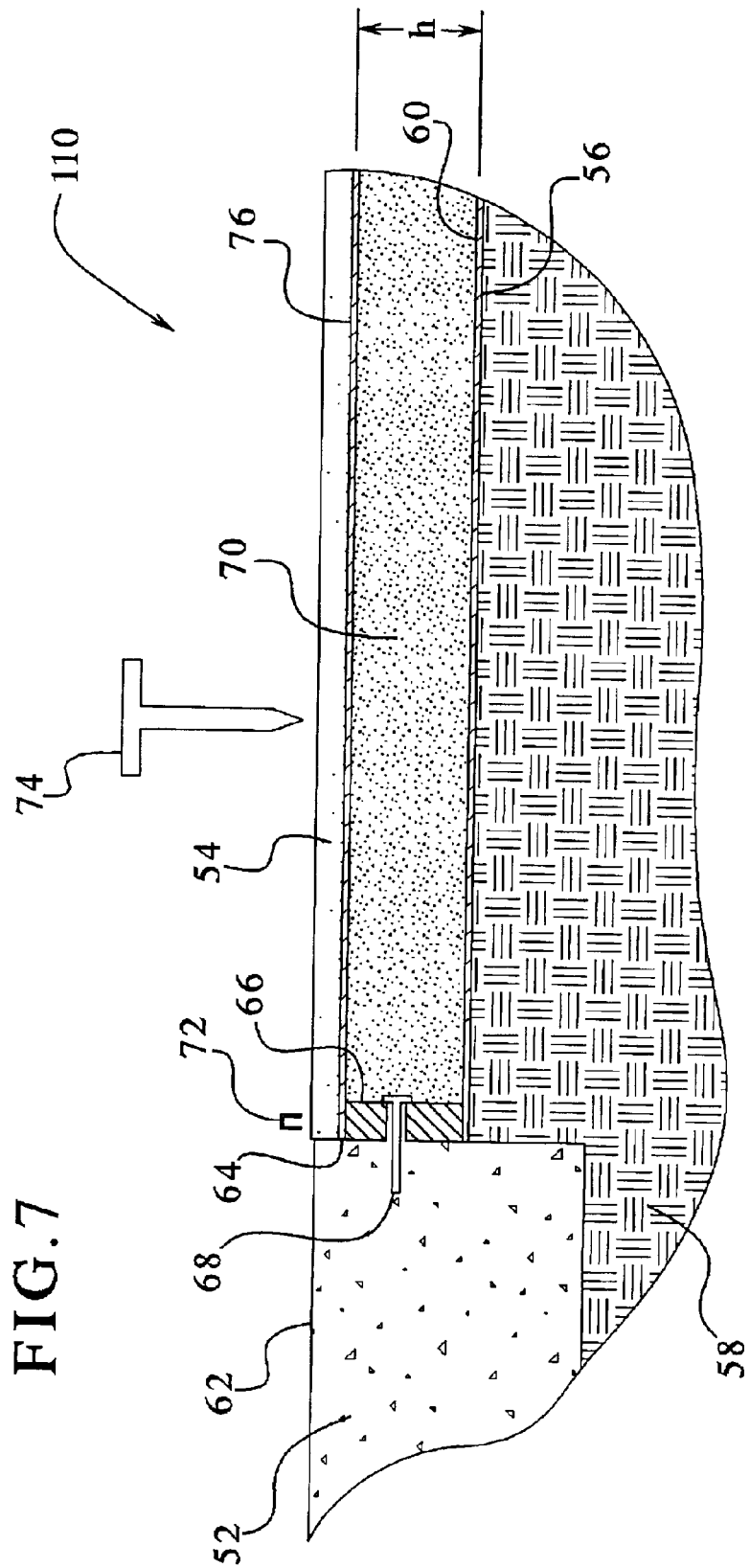
FIG. 7 is a fragmentary cross-sectional view, taken along the line VII—VII of FIG. 2, of another embodiment of the artificial turf system illustrating an airport runway section adjacent to an artificial turf surface, which includes a sub-surface having a water proof membrane and a weed barrier.

Referring now to FIG. 7, an fragmentary cross-sectional view, taken along the section line VII—VII of FIG. 2, of one embodiment of an artificial turf system 110 illustrates an airport runway or taxiway section 52 adjacent to the artificial turf 54 and a sub-surface having a weed barrier 56 and a waterproof membrane 76. A system 110 implementor preferably: (i) excavates, grades, scarifies and compacts an application specific amount of the soil 58 to create a desired soil surface 60 (for existing airports and in certain instances for a new airport); (ii) installs a desired weed barrier 56 onto the soil surface 60; (iii) glues and ramsets a composite stud or member 66 using a suitable non-toxic glue and ramset 68; (iv) installs and compacts to tested specification an application specific amount of base material 70, preferably ¾ inch (1.87 cm) road base or ¾ inch (1.87 cm) minus crushed rock with binder; (v) installs a second sheet, which in this embodiment is a waterproof membrane 76, and the staples or suitably attaches the membrane to the top of the composite stud or member 66; (vi) installs a preferred two inch (5 cm) artificial turf by stapling and gluing the turf initially to the composite stud or member 66, sews separate adjacent and interior sections of turf together as necessary, pulls the sewed section taught, and drives pinning devices 74 in a preferred grid pattern to secure the turf before applies infill; and (vii) applies an application specific infill (preferably non-uniform sand) to an application specific height (preferably one inch (2.5 cm) below the tips of the turf's grass-like fibers).

The waterproof membrane 76 includes any commercially available pond liner or water impermeable membrane, preferably between 2 and 30 mils thick. One possible waterproof membrane 76 made by Little Giant Pump Co. is a 20 mil thick plastic, e.g., polypropelyne, sheet, which a system implementor can order in ten or fifteen foot (4.5 m) wide rolls or sheets. The system implementor lays one fifteen foot (4.5 m) width in target areas near runways or taxiways or lays a large area having the weed barrier. The implementor preferably lays multiple passes of the membrane employing a shingle-like overlap in concert with the grade to ensure down hill flow. Six inches (15 cm) of overlap is sufficient.

As stated above, the system implementor employs the flow through system 50 of FIG. 3 in most applications. Most applications, however, will have one or more areas, usually near drains, retention or detention ponds, wherein the system implementor employs the waterproof membrane 76 in lieu of the upper weed barrier 56. The sheeting system 110 of FIG. 7 moves water along the grade as opposed to the vertical absorption and drainage of the flow through system 50.

In one example of a sheeting application, a particular airport may desire to have an area of fifteen feet (4.5 m) adjacent to a runway or taxiway that is never to have standing water under any weather conditions, e.g., access under any conditions. The system implementor installs the sheeting system 110 for the first fifteen feet (4.5 m) in one method by: (i) gluing the membrane 76 to the composite stud or member 66; (ii) stapling the membrane 76, along the glue bead, to the composite stud or member 66 using, e.g., 1 inch (2.5 cm) sod pins; (iii) pulling the membrane 76 taught; (iv) gluing the turf 54 to the membrane 76; and (v) stapling the turf 54, along the glue bead, to the composite stud or member 66 using, e.g., 1 inch (2.5 cm) sod pins. After fifteen feet (4.5 m), the system implementor then installs the flow though system 50, which includes dual weed barrier layers 56.

Referring now to FIG. 8, a fragmentary cross-sectional view, taken along line VIII—VIII of FIG. 2, of a drainage system 130 illustrates another waterproof membrane application for the present invention. As mentioned above with respect to FIG. 2, the present system accommodates and preferably enhances existing drains or drainage ways. The drainage system 130 includes a concrete drain 132 having a drainhole 134 that allows water to drain into a main pipe, retention or detention pond (not illustrated). The drainage system is built into the existing soil 58, which is likely graded to run water to the drain 132.

In many instances, the land will have heaved or risen around the drain, not allowing proper flow to the existing drain. The drainage system 130 includes excavating, scarifying, regrading and compacting the soil 58 around the drain 132, installing a weed barrier 56 as described above, laying and compacting an application specific amount and type of base material 70, and then applying the waterproof membrane 76 and the turf 54.

The drainage system 130 preferably includes a lip 136 of material (exaggerated here for illustration) of approximately ¹⁄₁₆ inch to ¾ inch (0.15 to 1.87 cm), wherein the waterproof membrane 76 and the turf 54 extend past the edge of the drain 132, which enhances and enables the water to drain smoothly into the drainhole 134 of the drain 132. The membrane 76 is preferably glued to the surface of the porous concrete drain 132 using the non-toxic glue and method described above. The infill layer, which is preferably washed sand, compresses the artificial turf 54 onto the membrane 76. The drainage system 130 also includes suitable ramsets or other suitable fastening devices driven into the concrete drain 132 (not illustrated) to hold the membrane 76 and turf 54 in place until the glue sets up. The system implementor applies the waterproof membrane 76, which sheets the drainage water to the drainhole 134, for at least three to four feet (90 to 120 cm) and preferably to ten or fifteen feet (3 or 4.5 m) around the drain.

Turf/Natural Grass Interface Embodiment

Referring now to FIG. 9, a fragmentary cross-sectional view, taken along line IX—IX of FIG. 2, of one preferred embodiment 140 for interfacing the synthetic turf 54 and the sub-surface of the present invention with natural grass 142 is illustrated. As mentioned above with respect to FIG. 2, the present system includes interfacing with existing natural grass, such that an airport selectively installs synthetic turf in target areas and specifically in areas adjacent to runways or taxiways. The system 140 includes a convenient method for securely interfacing the turf 54 with existing grass, such that the interface survives severe winds.

The interface embodiment 140 includes digging a trench 144 into the existing soil 58 along a desired interface line of the airfield. The trench 144 is preferably sufficiently deep to secure a piece of vertical turf 146 that is folded over the base material 70 and backfilled with compacted soil 148. A one foot (30 cm) deep by four inch (10 cm) wide trench is generally sufficient. Well known trenchers can dig thousands of feet of this trench in an hour. The system implementor then plants natural grass sod 142 or seed, depending on the proximity of the interface to the runway or taxiway (sod too close to the runway can fly up and become a FOD, however, a turf/grass interface is preferably at least 150 feet (45 m) from the runway or taxiway).

Arrester Bed System

Figure 10:
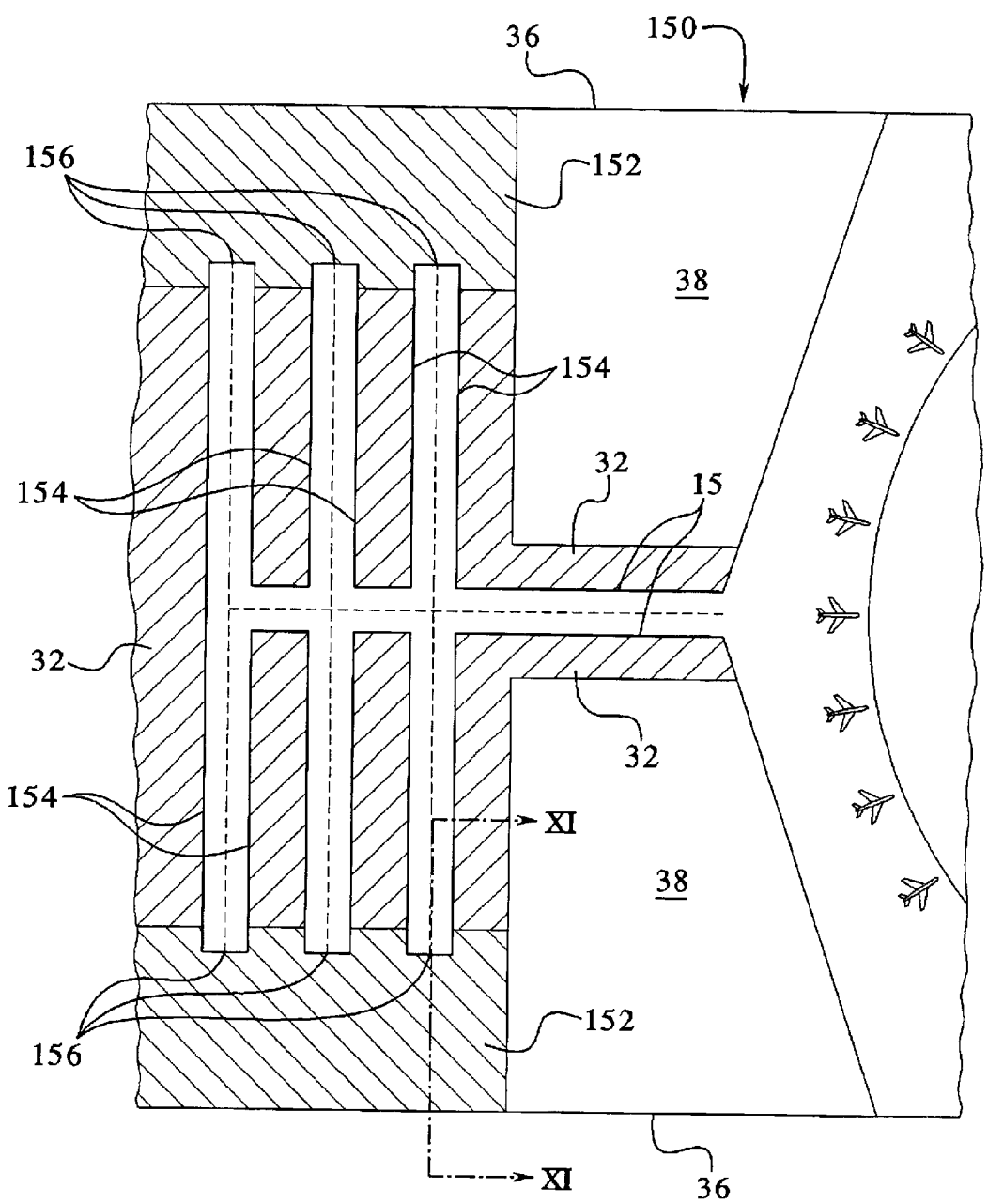
FIG. 10 is a fragmentary top plan sectional view of an airport or airfield, illustrating sections of airport runways, taxiways and areas of adjacent synthetic turf employing a soft ground arrester system of the present invention.

Referring now to FIG. 10, a top plan sectional view of an airport or airfield 150, including sections of airport runways, taxiways and areas 152 of adjacent synthetic turf employing a soft ground arrester system of the present invention is illustrated. The present invention preferably includes the artificial turf system 50 or 110 (FIGS. 3 and 7 respectively) in areas 32 adjacent to or substantially adjacent to the runway or taxiway sides 154. The present invention preferably includes the arrester bed areas 152 having an arrester bed sub-surface adjacent to the runway or taxiway ends 156 wherever possible. Again, it is conceivable that the runways or taxiways contain obstacles, such as drains, etc., along their sides 154 or ends 156 that do not allow the turf to be uniformly applied along their edges.

The arrester bed areas 152 include many of the aesthetic and drainage features of the artificial turf systems 50 and 110. The arrester bed areas 152 are additionally adapted to slow the motion and absorb the kinetic motion of an aircraft that has traveled off of a runway or taxiway. Particular airport operators or administrators may desire that the arrester bed areas 152 be additionally installed along a portion of one or more runway or taxiway sides 154 to protect a plane that exits the runway or taxiway along their sides. As illustrated, the present invention additionally includes the arrester bed areas 152 adjacent to a portion of the runway or taxiway sides 154.

The arrester bed areas 152 are installable on one or both runway or taxiway ends 156, as desired by the airport. The arrester bed areas 152 are adaptable to be installed to match any shape or contour created by the turf areas 32, runway or taxiway sides 154 and ends 156, airport fences 36, natural grass areas 38 or by any other road, driveway, accessway, pathway, tree, bush, building, garage, hanger (not illustrated), or any other structure associated with an airport. The arrester bed areas 152 likewise accommodate any interior obstruction, such as runway lights, interior natural grass sections, trees, bushes, drains or drainage ways, interior or access roads, buildings, garages, hangers (not illustrated), or any other structure associated with an airport. The interface embodiment of FIG. 9 also applies to an interface between the arrester bed areas 152 and the natural grass areas 38.

The arrester bed areas 152 include any area of turf having any distance perpendicular to a runway or taxiway side 154 or end 156. Airport operators most likely install the arrester bed areas 152 around runways, however, they are installable around taxiways as well. For purposes of illustration, the term runway includes runways, taxiways or any road traveled by airplanes. It is recommended that an airport install an arrester bed area 152 on both runway ends 156 perpendicularly from between 200 to 1000 feet (60 to 300 m) to provide enough area to properly slow a runaway aircraft. Many airports contain parallel runways less than 300 feet (90 m) apart. If so, the airports include a large arrester bed area 152 at each runway end 156, as shown, or include a plurality of individual arrester bed areas 152.

Figure 11:
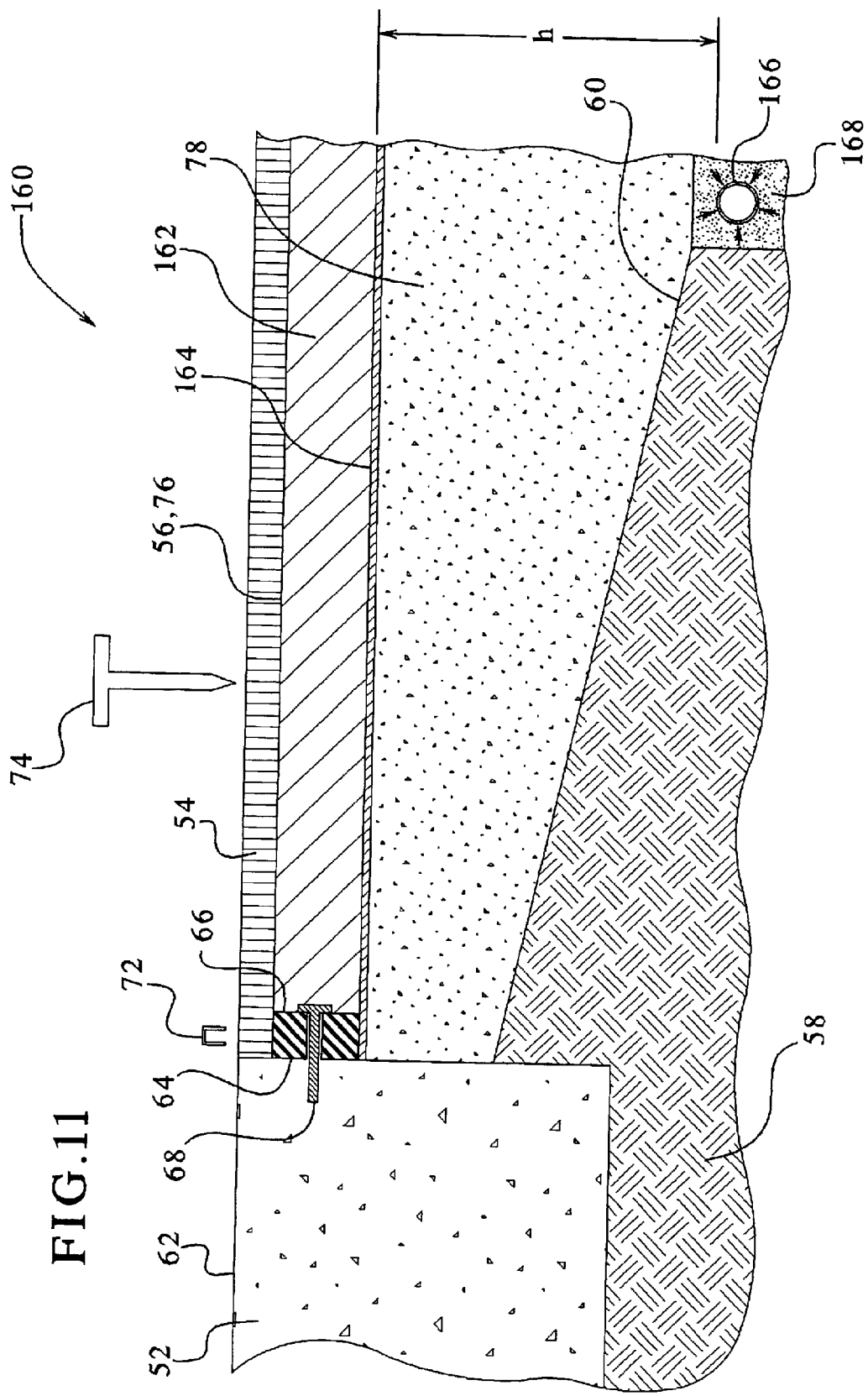
FIG. 11 is a fragmentary cross-sectional view, taken along line XI—XI of FIG. 10, of one embodiment of a soft ground arrester system illustrating an airport runway section adjacent to an artificial turf surface, which includes a sub-surface having a soft ground arrester bed.

Referring now to FIG. 11, a fragmentary cross-sectional view, taken along line XI—XI of FIG. 10, of one embodiment of a soft ground arrester bed system 160 employing a synthetic turf and a sub-surface having an arrester bed is illustrated. A system implementor installs the arrester bed system 160 using a different sequence or method than those described above in connection with the artificial turf system 50 of FIG. 3 and the system 110 of FIG. 7. Namely, the system implementor: (i) excavates, grades, scarifies and compacts an application specific amount of the soil 58 to create a desired soil surface 60 (for existing airports and in certain instances for a new airport); (ii) installs a drain pipe 166 and a surrounding layer of washed rock 168, wherein the pipe 166 preferably leads to an airfield's drainage system; (iii) installs an application specific amount of arrester base material 78 onto the compacted soil surface 60; (iv) installs a thick weed barrier and stabilizer 164 on top of the arrester base material 78; (v) glues and ramsets a composite stud or member 66 via a suitable non-toxic glue and ramset 68; (vi) installs a second arrester base material 162 onto the heavy weed barrier 164; (vii) preferably installs a thin weed barrier 56 or alternatively a waterproof membrane 76 onto the second arrester base material 162, and staples the barrier or membrane to the top of the composite stud or member 66; (viii) installs a preferred two inch (5 cm) artificial turf by stapling and gluing the turf initially to the composite stud or member 66, sewing separate adjacent and interior sections of turf together as necessary, pulling the sewed section taught, and driving pinning devices 74 in a preferred grid pattern to secure the turf before applying infill, and (ix) applying an application specific infill (preferably non-uniform sand) to an application specific height (preferably one inch (2.5 cm) below the tips of the turf's grass-like fibers).

The primary differences between the arrester bed system 160 and the artificial turf systems 50 and 110 of FIGS. 3 and 7, respectively, include the typical locations of the systems disclosed above in FIG. 10 and the base material 70 of the prior systems versus the arrester base materials 78 and 162. The arrester bed system 160 includes a base material 78 that characteristically retards plant and animal life, absorbs water, enables water to drain through to the soil surface 60 and provides a cushioned or slightly collapsible, energy absorbing characteristic to the sub-surface of the arrester bed system 160. The arrester base material 78 includes any material having these characteristics including, but not limited to: rolled rock, sand, rubber, foamed rubber, plastic, cork, or any combination or derivative thereof.

The arrester base material 78 is preferably washed ⅜ inch (0.93 cm) rolled rock, which is commonly referred to as pea gravel. The rock used for the arrester base material 78 is preferably uncrushed, is preferably not compacted and is likewise of roughly the same size, i.e., ⅜ inch (0.93 cm) average diameter. The same size rock creates a layer having interstices or openings that enable energy absorption and facilitate flow through drainage. The arrester bed system 160 is preferably a flow-through rather than a sheeting system.

The height h of the base material 78 is application specific but is preferably the depth of the excavation along the runway end or side wall 64 less the height of the fibers of the artificial turf 54, wherein the fiber tips are substantially parallel with the runway surface 62 and less the height of a layer of a second base material 162. One major difference between the arrester bed system 160 and the artificial turf systems 50 and 110 of FIGS. 3 and 7, respectively, is that the height h of the base material 78 varies, while the top surface of the artificial turf 54 remains substantially flat and substantially coplanar with the runway surface 62.

The arrester bed system 160 preferably gradually brings a runaway plane to a stop. An arrester system having a deeper height h absorbs more energy more quickly. If the height h of the base material 78 is initially too deep, a runaway plane may stop too fast and cause the plane's landing gear to collapse and the cargo and passengers of the plane to lurch forward. The height h therefore preferably deepens as the arrester bed system 160 spans away from the end or the side wall 64.

The depth of the excavation for the arrester bed system 160 is typically deeper than the depth of the excavation for the artificial turf systems 50 and 110 of FIGS. 3 and 7, respectively. The arrester bed systems 160 include an initial excavation at the runway end or side wall 64 of between eight inches and three feet (20 and 90 cm). The initial excavation includes being deeper than the depth or thickness of a runway, in which case the system implementor takes sufficient steps to not damage the integrity of the soil beneath the runway.

As illustrated, the system implementor grades the soil surface 60. The severity of the grade depends primarily on the length or perpendicular distance that the arrester bed system 160 spans from the end or side wall. The excavation typically reaches a depth of between 20 inches and four feet (50 and 120 m) depending on the arrester base material 78 and the type and weight of airplanes taking off and landing at the airport. If possible, the system implementor employs a conventional grade of one quarter inch (0.62 cm) for every foot (30 cm) in a direction perpendicular to the runway, approximately a two percent drop, until a desired depth is reached. In shorter applications, e.g., 200 to 400 feet (60 to 120 m), the grade may have to be steeper to reach the desired depth.

After grading the soil 58, the system implementor preferably compacts the soil surface 60 to between 90 and 95 percent. Before compacting, the present invention contemplates scarifying approximately four inches of the unexcavated topsoil 58. Scarification enables better compaction, which aids in providing a firm base. A four-ton double drum roller or a sheep's-foot compactor can be used to compact the soil 58.

The arrester bed system 160 is preferably a flow through system, wherein water drains vertically to the compacted soil surface 60, down the soil's grade and into a drain pipe 166. The drain pipe 166 includes any synthetic or metal pipe or tube and is preferably a 4 inch (10 cm) NPT PVC pipe. The pipe 166 lays parallel with the wall 64 and captures drain water through perforations approximately ⅛ wide inch by two inches (0.31 by 5 cm) along in the pipe's wall. The perforations are preferably spaced so that the longer two inch (5 cm) length runs radially along the pipe. The perforations are spaced apart approximately one half inch (1.25 cm).

To keep the soil 58 and arrester base material from filling the drain pipe 166, the system implementor preferably surrounds the pipe with one to six inches (2.5 to 15 cm) of washed rock 168 of sufficient size so as not to pass through the perforations. The system implementor preferably digs a suitable trench using a known trench digger, fills the trench partially with the washed rock 168, lays the pipe 166 and fills the remainder of the trench with the washed rock 168. The implementor then installs or pours the arrester base material 78 to have a substantially flat surface that is parallel to the runway surface 62.

The implementor installs a heavy weed barrier 164 onto the surface of the arrester base material 78. The heavy weed barrier is a thick weed barrier, preferably ⅛ inch (0.31 cm), which is plastic or other fabric, woven, or thermally bonded or otherwise suitably formed. The heavy weed barrier and stabilizer 164 includes a Polyspun brand drainage/weed control fabric made by Landmaster Products of Engelwood, Colo. As above, the heavy weed barrier 164 prevents weeds or other plants as well as grubs or worms from traveling from the soil surface 60 though the remainder of the arrester system 160. The heavy weed barrier 164 also enables the water to flow from the arrester system 160 into the soil 58. The weed barrier 164 is thicker to provide extra support to the system, which preferably includes uncompacted arrester base material 78.

The system implementor installs the composite stud or member 66 using ramsets 68 and non-toxic glue as described above in connection with FIG. 3. The implementor installs a second arrester base material 162 onto the heavy weed barrier 164. The arrester base material 78 is preferably uncompacted and likewise less adept at keeping weeds and other contaminants from propagating out of the soil 58 and traveling through the arrester base material 78 and the remainder of the arrester system 160. The second arrester base material 162 includes any material that substantially retards plant and animal life, that allows flow through drainage and is preferably washed sand of between about 4 and 70 U.S. screen mesh size. A layer of the second arrester base material 162 is preferably constant throughout the area of the arrester system 160, is preferably between one and ten inches (2.5 and 25 cm) deep and is preferably four inches (10 cm) deep or approximately the same as the height of composite stud or member 66.

The implementor installs a weed barrier 56 onto the top of the second arrester base material 162. The preferred weed barrier 56 and its preferred method of installation are discussed above in connection with FIG. 7. In certain areas of the arrester system 160, the implementor may desire to sheet water. The arrester system 160 thus includes a waterproof membrane 76, described above in connection with FIG. 7, in the place of the weed barrier 56.

A preferred two inch (5 cm) artificial turf 54 is installed such that the fiber tips are substantially coplanar or slightly below the runway surface 62, as described above in connection with FIG. 3. A washed sand infill layer (not illustrated) having varying sized granules, such as the infill 82 of FIG. 5, is installed, smoothed and compacted by making one or more passes with a four-ton double drum roller, as described above. The method of laying, sewing, stretching, and pinning the artificial turf 54 of the arrester system 160 is substantially the same as that disclosed in connection with the system 50 of FIG. 3.

Artificial Turf for Repelling Birds or other Animals

Figure 12:
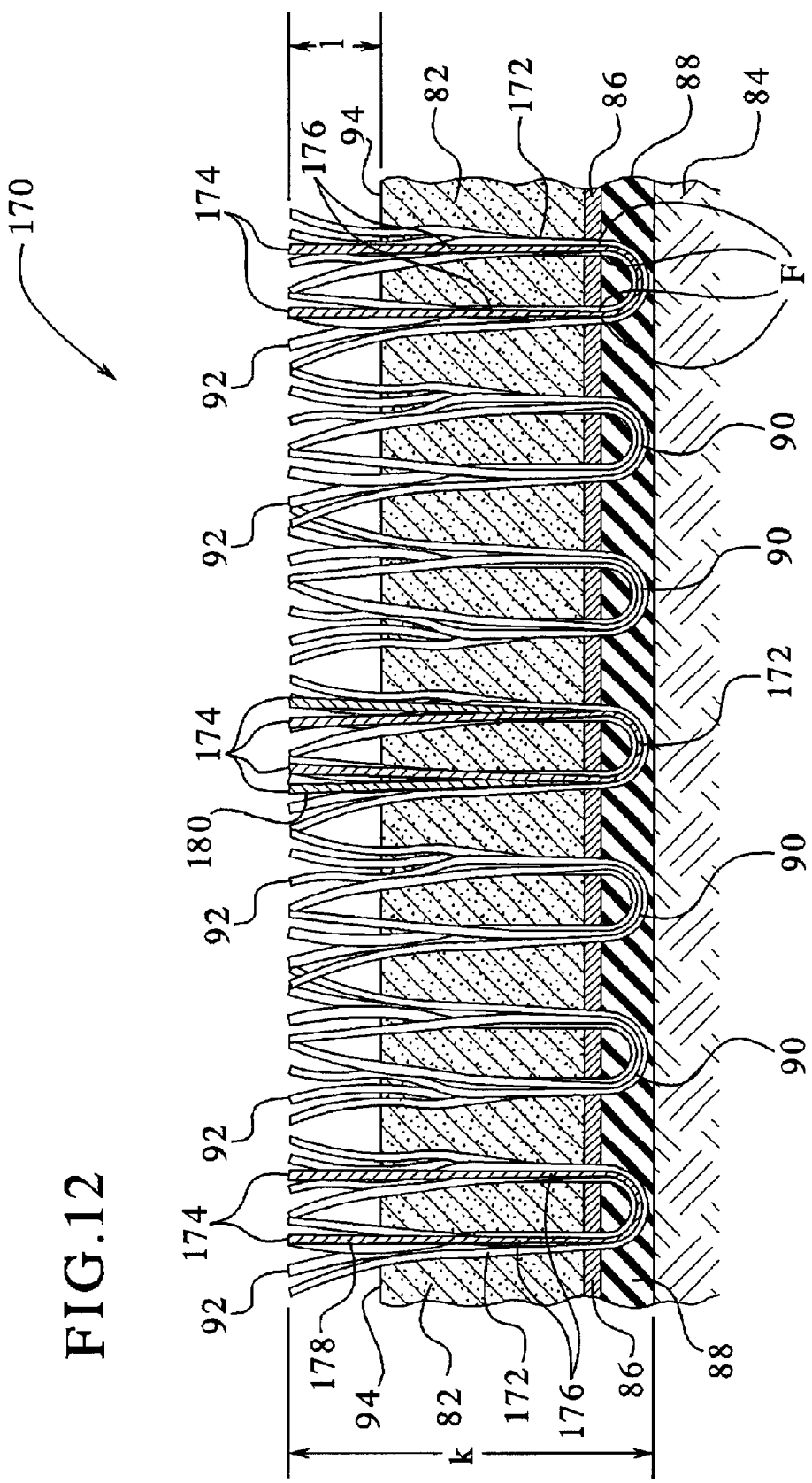
FIG. 12 is a fragmentary front elevation sectional view taken through one embodiment of an artificial or synthetic turf having spaced-apart repelling fibers.

Referring now to FIG. 12, a front elevation sectional view through an embodiment 170 of artificial or synthetic turf is illustrated, wherein a plurality of the grass-like fibers 90 are replaced by stiff, spiny, barbed, needle bearing or prickly fibers or any combination thereof which are referred to herein as repelling fibers 172, and which repel loitering animals. The repelling turf 170 is preferably laid over a sheet 84. As discussed above in the flow-through embodiment of FIG. 3, the sheet 84 is a weed barrier. In a sheeting embodiment discussed in FIG. 7, the sheet 84 preferably includes a waterproof membrane. A 12 or 15 foot (3.6 or 4.5 m) roll of the repelling turf 170 preferably includes a primary flexible backing 86, e.g., of double woven polypropylene and a secondary flexible backing 88, e.g., which is preferably polyurethane. The backings are alternatively any known primary or secondary backing, some of which are disclosed above in connection with FIG. 1. The thickness of the primary backing 86 is preferably provided by a manufacturer. The thickness of the secondary backing 88 is preferably between 10 and 20 mils.

The repelling turf 170 includes a plurality of flexible fibers 90 and repelling fibers 172, which are tufted or stitched into the primary backing 86. The secondary backing 88, applied after stitching, covers some or all of the tuft or stitch depending on the thickness of the secondary backing 88. The repelling turf in one embodiment includes 19 tufts or stitches per every three inches (7.5 cm) or any number of stitches disclosed above in connection with FIG. 1. The flexible fibers 90 are preferably fribulated (i.e., separate filaments remain connected at certain points so that the yarn if stretched apart creates a honeycombed mesh) to form separate grass-like strands 92. The fibers 90 include being of any material disclosed above in connection with FIG. 1 and are preferably polypropylene, 7500 denier and 32 ounces per square yard.

The repelling fibers 172 include metal wire, stiff or hard plastic fibers, metal wire with a plastic coating, fiberglass fibers, etc. The repelling fibers 172 preferably include one or more relatively stiff plastic, e.g., polypropylene, polyethylene, polyurethane, nylon, polyester, etc., woven or monofilament (non woven) fibers 174 of approximately 10,000 denier.

The stiff plastic fibers 174 are preferably tufted or stitched into the primary backing 86 with the flexible fibers, so that the repelling fibers also preferably include grass-like strands 92. FIG. 12 illustrates that the repelling turf 170 includes repelling fibers 172 that are preferably tufted and folded over to form a U shape. That is, one repelling fiber 172 is preferably tufted or stitched, via existing stitching machines, through the primary backing 86 to form the illustrated U shape having two stems 176, each having a stiff plastic fiber 174. A compressive, frictional force F applied to the repelling fiber 172 by the primary backing 86, due to the stitching process, holds the repelling fiber 172 in place. The secondary backing 88 also clamps the fiber 172 in place.

Alternatively, the repelling turf 170 includes a single repelling fiber 172 (not illustrated), which is again preferably a stiff plastic, e.g., polypropylene, polyethylene, nylon, polyester woven or monofilament fiber 174 of approximately 10,000 denier, and which is not folded over, but includes an attached end. That is, the alternative fiber 172 includes only one stem 176. One method for attaching a single repelling fiber 172 (not illustrated) is to provide a ball, tab or thicker portion at the attached end of the repelling fiber 172, which enables the single stem 176, but not the ball or tab, to pass through the primary backing 86. The compressive, frictional force F applied to the repelling fiber 172 by the primary backing 86, as well as a clamping force applied by the secondary backing 88, secure the ball, tab or thick portion between the primary and secondary backings.

Both the preferred dual stem or U shaped fiber embodiment and the single stem embodiment preferably include a stiff plastic fiber 174, of approximately 10,000 denier, as illustrated by the fiber 178. Both the preferred dual or U shaped fiber embodiment and the single repelling fiber embodiment also contemplate including a plurality of stiff plastic fibers 174, of approximately 10,000 denier, as illustrated by the fiber 180.

The height of the grass-like strands 92 and the tips of the repelling fibers 172, k, above the bottom of the secondary backing 88 includes being ½ inch to six inches (1.25 to 15 cm), preferably 1½ to 2½ inches (3.75 to 6.25 cm) and most preferably 2 inches (5 cm). As illustrated in FIG. 1, the individual fribulated or slit filaments are twisted together near the stitched end and come apart at the top. The present invention contemplates using such a twisted fiber. Alternatively, the manufacturer makes the repelling fibers 172, such that the individual stiff plastic fiber(s) 174 and grass-like strands 92 stack one on top of the other. The repelling turf 170 includes either style.

The repelling turf 170 preferably provides an uncomfortable (but not unsafe) environment for birds and animals. That is, the stiff plastic fibers 174 preferably annoy an animal's paw or a webbed foot of a loitering bird, such as a seagull, but do not injure the paw or foot in any way. The repelling turf 170 preferably quickly teaches the target animals to stay away before the system inflicts even limited damage. The present invention thus contemplates including the repelling turf in any of the artificial turf systems 50 and 110 of FIGS. 3 and 7 and the arrester system 160 of FIG. 11, wherein the repelling turf includes stiff, spiny barbed, needle bearing or prickly fibers or any combination thereof.

The infill layer 82 of the repelling turf 170 is any a material that characteristically retards plant and animal life, absorbs water and enables it to drain through to the primary backing 86 and the secondary backing 88 and provides a firm and stable foundation for the flexible fibers 90 and the repelling fibers 172. The infill layer 82 includes any material having these characteristics including, but not limited to: rock, sand, concrete, plastic, fiberglass, rubber, ceramic material, cork, or any combination or derivative thereof.

The infill layer 82 is preferably crushed rock or sand and most preferably washed sand. In certain instances, e.g., in the rainy Northwest, the infill layer includes being ¼ inch (0.62 cm) minus crushed rock (i.e., ¼ inch (0.62 cm) average diameter rock down to rock particles) to enhance drainage. Referring to the terminology used in connection with FIG. 1, the infill layer 82 includes resilient materials, such as: (i) granulated cork; (ii) rubber particles including natural rubber or synthetic rubber; (iii) beads of synthetic polymers e.g., vinyl chloride, vinyl ethers, vinyl acetate, acrylates and methacrylates, polyvinylidene chloride, urethanes, polyamids and polyesters; and (iv) synthetic polymer foam particles; (v) vinyl foams, e.g., polyvinyl chloride foams, polyvinyl ether foams, foamed polystryene, foamed polyurethanes and foamed polyesters; and (vi) foamed natural rubber.

The size of the sand in the infill 82 preferably varies between about 4 and about 70 U.S. screen mesh size. The repelling turf 170 does not require the sand to be less abrasive and prefers a range of sizes, which facilitates better compaction. The repelling turf 170 includes compacting the infill layer 82 of preferably variable sand particles using a four-ton double drum roller by making one or more passes over the repelling turf 170. The stiff plastic fibers 174 are therefore of a material that does not crack, snap or permanently deform upon compaction.

The length I, which is the average distance of the tips of the grass-like strands 92 and the tips of the repelling fibers 172 above a top surface 94 of the infill layer 82, includes the range of ⅛ to 5 inches (0.31 to 12.5 cm). The airfield application of the repelling turf 170 preferably projects an inch (2.5 cm) of the flexible strands 92 and repelling fibers 172 above the infill surface 94, which shield the sand infill 82 from the weather and from any winds created when the plane takes off or lands. In an application wherein the flexible strands 92 and the repelling fibers 172 are preferably two inches (5 cm) high, the infill layer 82 is preferably one inch (2.5 cm) high and the distance I is preferably one inch (2.5 cm).

Figure 13:
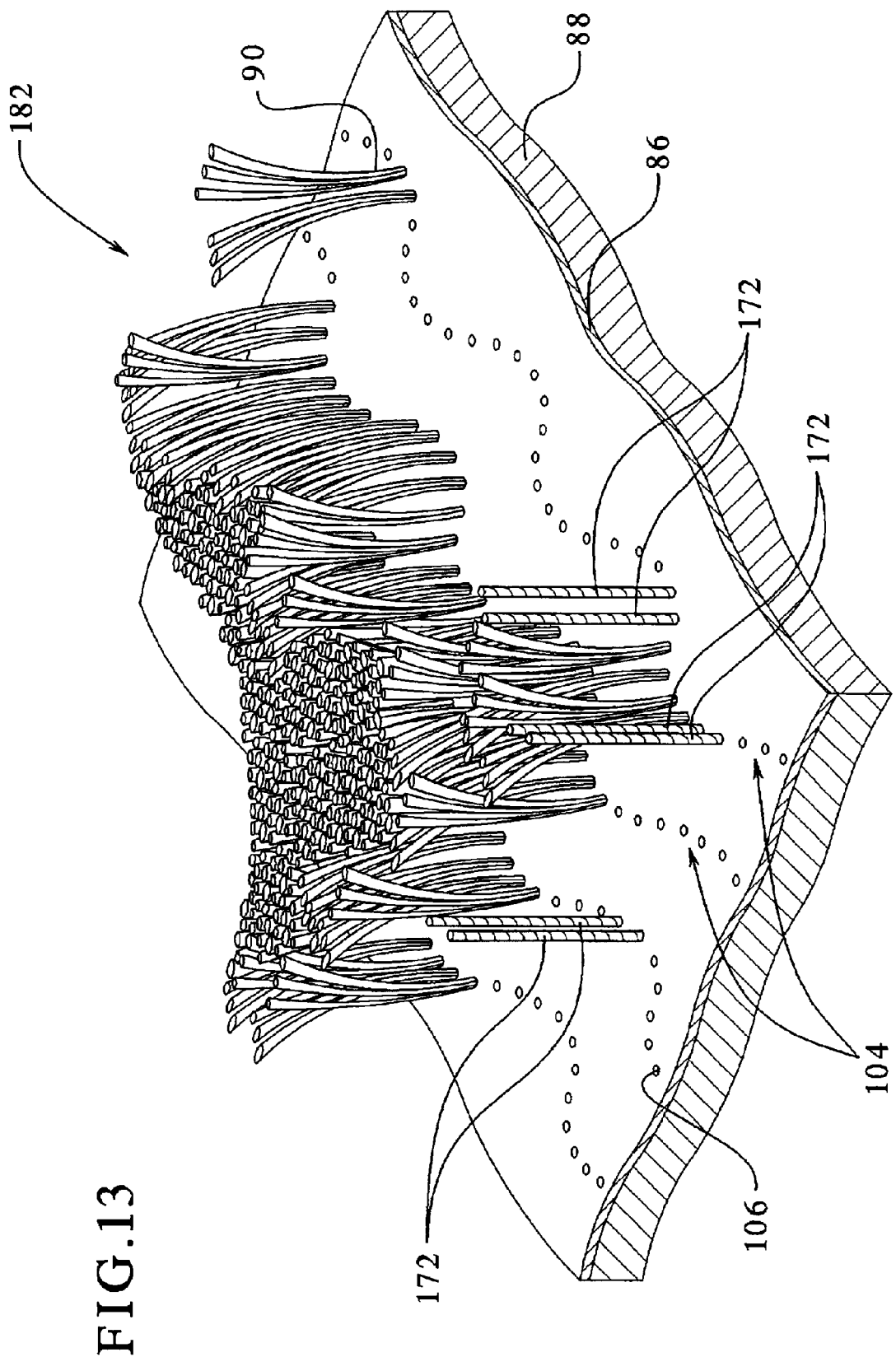
FIG. 13 is a fragmentary perspective sectional view taken through one embodiment of an artificial or synthetic turf having spaced-apart repelling fibers.

Referring now to FIG. 13, a top-front perspective sectional view through one repelling turf embodiment is illustrated, wherein a plurality of the flexible fibers 90 are replaced by repelling fibers 172 that repel loitering animals. The repelling turf section 182 has a plurality of the flexible fibers 90 and repelling fibers 172 cut away to illustrate a plurality of rows 104 of stitch or tuft holes 106. As discussed above, the repelling turf section 182 preferably includes a primary backing 86 and a secondary backing 88 and the above described methods of repelling fiber attachment. The rows 104 in this embodiment are alternatingly curved in a serpentine shape to prevent any possible "corn-row" effect from parallel rows. It is contemplated that straight rows of the repelling turf section 182 do not produce a corn-row effect. The repelling turf section 182 therefore includes alternatingly curved or straight rows.

The rows 104 of the repelling turf section 182 include being spaced apart from between ¼ to 2 inches (0.62 to 5 cm), but are preferably spaced apart ⅜ to ¾ inch (0.93 to 1.87 cm) and most preferably spaced apart ¾ inch (1.87 cm). Known stitching machines are set to stitch rows in multiples of ⅜ inch (0.93 cm), so if a system implementor desires a wider row, a row of 1⅛ or 1½ inches (2.81 or 3.75 cm) is likely the most feasible. The repelling turf section 182 includes repelling fibers 172 interspersed among the flexible fibers 90, which the present invention contemplates interspersing a plurality of ways.

In one embodiment, the repelling turf section 182 includes interspersing one or more adjacent repelling fibers 172 among one or more flexible fibers 90 of a particular row 104. In a single row, the repelling turf section 182 includes one or more adjacent repelling fibers 172 after every flexible fiber 90, after every two adjacent flexible fibers 90, after every three adjacent flexible fibers 90, etc., or after any number of adjacent flexible fibers 90, the number being from one to one hundred flexible fibers 90. In a single row, the repelling turf section 182 includes one or more adjacent repelling fibers 172 after every ¼ inch (0.62 cm) of flexible fibers 90, after every ¼ inch to ½ inch (0.62 to 1.25 cm) of flexible fibers 90, after every ½ inch to ¾ inch (1.25 to 1.87 cm) of flexible fibers 90, etc., or after any ¼ inch (0.62 cm) range of adjacent flexible fibers 90, the ranges existing from between 0 to ¼ inch (0 to 0.62 cm) to between 15 ¾ inches to 16 inches (39.37 to 40 cm).

Alternatively, the repelling turf section 182 includes interspersing one or more rows 104 of repelling fibers 172 among one or more rows 104 of flexible fibers 90. The repelling turf section 182 includes one or more rows of adjacent repelling fibers 172 after every row of flexible fibers 90, after every two adjacent rows of flexible fibers 90, after every three adjacent rows flexible fibers 90, etc., or after any number of rows of adjacent flexible fibers 90, the number being from one to fifty rows of flexible fibers 90. The one or more rows of adjacent repelling fibers 172 include each being entirely comprised of repelling fibers 172 or, alternatively, interspersing the repelling fibers 172 among the flexible fibers as described above. The present invention also includes one or more rows of adjacent repelling fibers 172 after every ¼ inch (0.62 cm) of flexible fibers 90, after every ¼ inch to ½ inch (0.62 to 1.25 cm) of flexible fibers 90, after every ½ inch to ¾ inch (1.25 to 1.87 cm) of flexible fibers 90, etc., or after any ¼ inch (0.62 cm) range of adjacent flexible fibers 90, the ranges existing from between 0 to ¼ inch (0 to 0.62 cm) to between 15 ¾ inches to 16 inches (39.37 to 40 cm).

Manufacturing and Installation of Multi-Pigmented Turf

Figure 14:
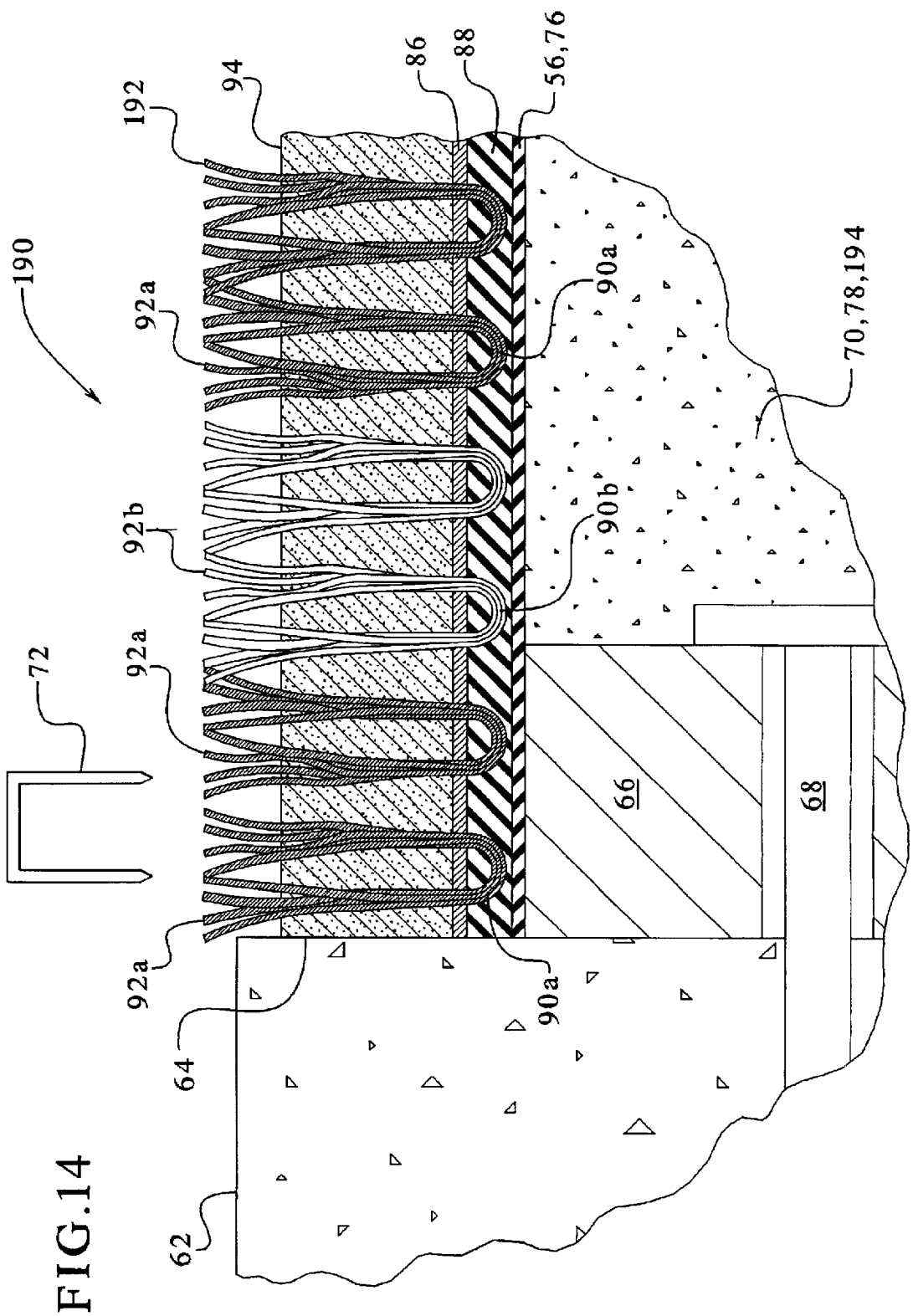
FIG. 14 is a fragmentary cross-sectional view, taken substantially along line XIV—XIV of FIG. 2, of one embodiment of the artificial turf system of the present invention illustrating an airport runway section adjacent to an artificial turf surface having multi-colored fibers or strands.

Referring now to FIG. 14, one embodiment of the airport marking system 190 of the present invention is illustrated. The airport marking system 190 includes a section of multicolored or multi-pigmented artificial or synthetic turf 192, adjacent to a section of an airport runway or taxiway top surface 62 and side wall 64. The turf system 190 is adaptable to incorporate the preferred turf 80 or the repelling turf 170, as discussed above. The multicolored or multi-pigmented turf 192 includes a plurality of different colored fibers 90a and 90b tufted or stitched into a primary backing 86 and preferably coated with a secondary backing 88. The multi-pigmented turf is preferably formed on a conventional multi-yarn carpet tufting or stitching machine. The conventional carpet stitching machine can employ a high-low technique or a pattern technique to produce the different colored fibers 90a and 90b of the multi-pigmented turf 192.

The different colored fibers 90a and 90b are preferably fribulated or otherwise separated to form separate grass-like strands 92a and 92b of different color, respectively. Although not illustrated, the multi-pigmented turf 192 alternatively includes one or more repelling fibers 172, which contains one or more stiff plastic fibers 174 as described above. The repelling fibers 172, including the stiff plastic fibers 174, have different colors based on their location in the multi-pigmented turf 192. A layer of suitable infill 94 is then placed between the grass-like strands 92a and 92b for stability and proper water drainage. In this illustration, either fiber 90a or 90b can be the base fiber, e.g., green, or the marking fiber, i.e., defining an airport marking.

The airport marking system 190 includes the base 70, the arrester base 78 or any other base 194 desired by the airport operators as discussed above, which includes dirt, sand, gravel, concrete, natural grass, brick or stone in a natural or compacted condition or any combination thereof in a natural or compacted condition. That is, the multicolored artificial turf 192 of the present invention may also be installed with the base 194 in airport areas not requiring either of the safety bases 70 or 78 as they are described above. The airport marking system 190 is adaptable to employ either the weed barrier 56 or the waterproof membrane 76 beneath the turf 192, as described above.

For sections of multi-pigmented turf installed adjacent to runways and taxiways, the multi-pigmented turf system 190 includes the composite stud 66 mastiqued and bolted to the runway side wall 64 via the ramsets 68, as described above. The multi-pigmented turf system 190 includes inserting the one inch (2.54 mm) staples 72 and the pinning devices 74 (not illustrated) as well as applying the glue as disclosed above to hold the turf in place. Each of these mounting devices enables snow removal from the multicolored turf 192, so that the airport markings of the system are visible. The multi-pigmented turf system 190 is adaptable to withstand the weight of a snow plow driving over the turf. Although the multi-pigmented turf system 190, as well as the other systems 50, 110 and 160 disclosed herein, can likely withstand the shearing force of the snow plow, another method of snow removal is contemplated.

Unlike natural grass, the artificial turf of the present invention withstands melting agents such as rock salt, calcium chloride and airplane deicing fluid. One method for removing snow from areas that the airport operators wish to have visible or accessible includes: (i) plowing or snow blowing a portion of the snow, leaving a layer of snow between a fraction of an inch (less than 2.5 cm) to several inches (several centimeters); and (ii) spraying or applying deicing fluid, rock salt, calcium chloride or other suitable snow melting agent on the remaining layer to melt the remainder of the snow.

The different colored fibers 90a and 90b of the multi-pigmented system 190 include a plurality of a first colored strands 92a adjacent to a plurality of second colored strands 92b. The first colored strands 92a and second colored strands 92b represent a multi-pigmented turf 192 having two different colors, e.g., a base color and a marking color, however, the multi-pigmented turf 192 includes having any number of desired pigments or colors. The embodiment of FIG. 14 illustrates that the present invention preferably achieves a visual differentiation by placing fibers of different colors adjacent to each other and, more preferably, rows of fibers of different colors adjacent to each other. Other forms of visually differentiating a marking fiber from a base fiber include providing different fiber heights, different fiber grains or different fiber tribulations or separations.

The multi-pigmented turf 192 preferably includes a tufted or stitched plurality of one color fiber 90a adjacent to a tufted or stitched plurality of a second color fiber 90b, so that the color differentiation is readily discernable. For illustration purposes, FIG. 14 includes two adjacent first colored fibers 90a on either side of two adjacent second colored fibers 90b. The multi-pigmented turf 192 may include a first colored artificial fiber 90a and one or more different colored artificial fibers adjacent to two sides of the first colored fiber 90a (e.g., 90b/90a/90b or 90b/90b/90a/90b/90b, 90b/90a/90c or 90b/90b/90a/90c/90c). The multi-pigmented turf 192 may include a plurality of adjacent first colored artificial fibers 90a and one or more different colored artificial fiber adjacent to two sides of the first colored fibers 90a (e.g., 90b/90a/90a/90b or 90b/90b/90a/90a/90b/90b, 90b/90a/90a/90c or 90b/90b/90a/90a/90c/90c).

Figure 15:
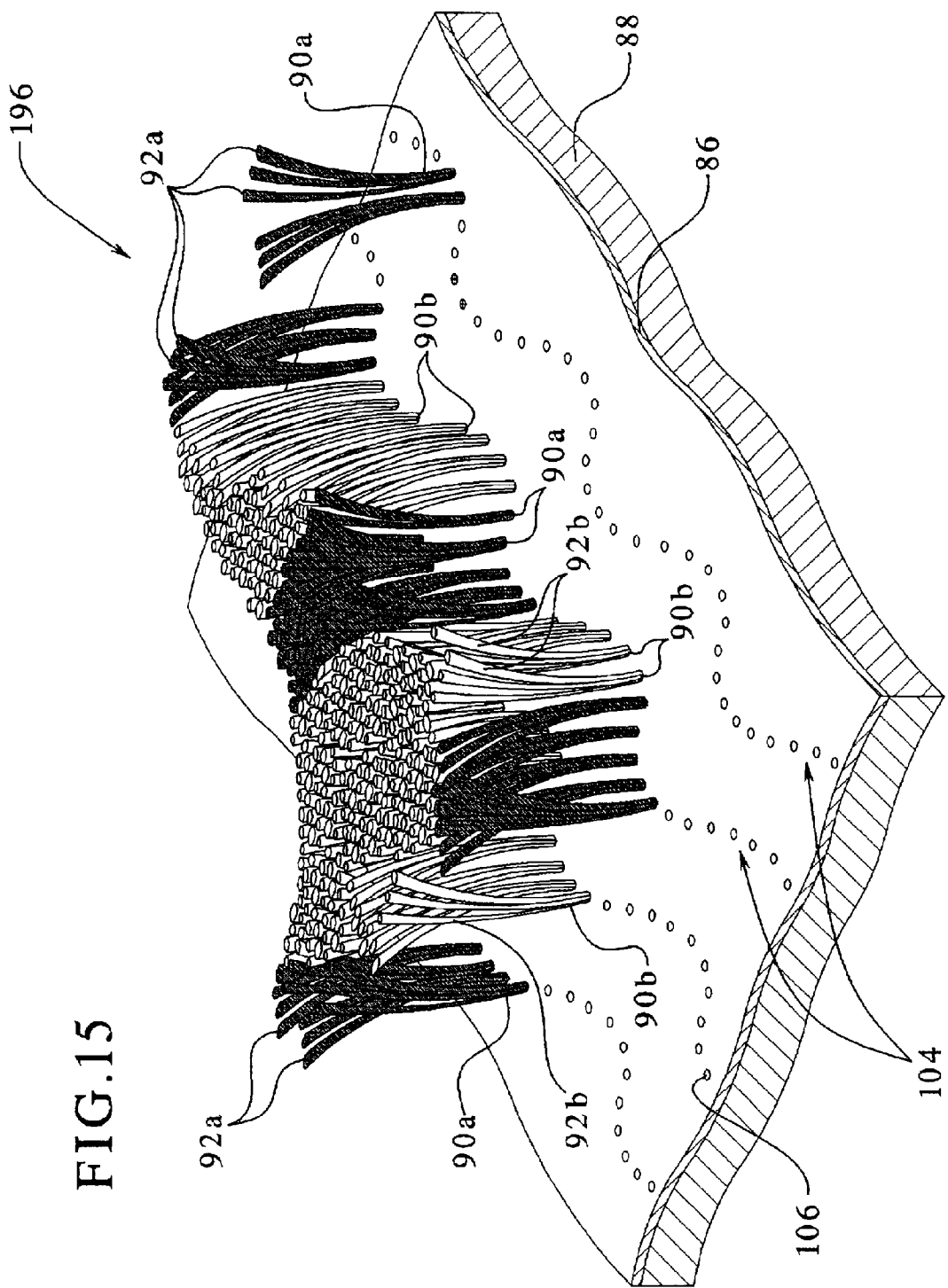
FIG. 15 is a fragmentary perspective view of one embodiment of artificial or synthetic turf having marking fibers or strands, wherein a section of the turf is cutaway to illustrate a plurality of rows of multi-pigmented tufted fibers.

The present invention contemplates three separate methods by which the multi-pigmented artificial turf 192 of the multi-pigmented system 190 is produced. Referring now to FIG. 15, the first method includes employing known multi-yarn tufting and stitching machines and methods to form a multi-pigmented turf segment 196 having a plurality of multi-pigmented polypropylene fibers of the desired denier. A number of the fibers are cutaway from their tuft or stitch holes 106 for purposes of illustration. The multi-pigmented fibers 90a and 90b are selectively, through known methods of control and control devices, tufted or stitched via multiple needles into the primary backing 86 and preferably coated by a secondary backing 88. The fibers 90a and 90b are then slit or fribulated to form grass-like strands 92a and 92b of varying color or pigment.

The rows 104 of tuft or stitch holes 106 include being curved or serpentine (as illustrated) or alternatively straight (not illustrated). When tufting or stitching the multi-pigmented fibers 90a and 90b, etc., the multicolored fibers are preferably dyed to their desired color and loaded as spools of yarn onto the known carpet machines. The dyes include fluorescent dyes and one or more or all of the colors, i.e., the base color or the marking colors, of the segment 196 are adaptable to be fluorescent. It should be appreciated from FIG. 15 that different shapes, objects, patterns, characters or designs, having two or more pigments, i.e., a base color and one or more marking colors, are achieved by varying pigments in the same row 104 as well as varying pigments in different or adjacent rows 104.

Figure 16:
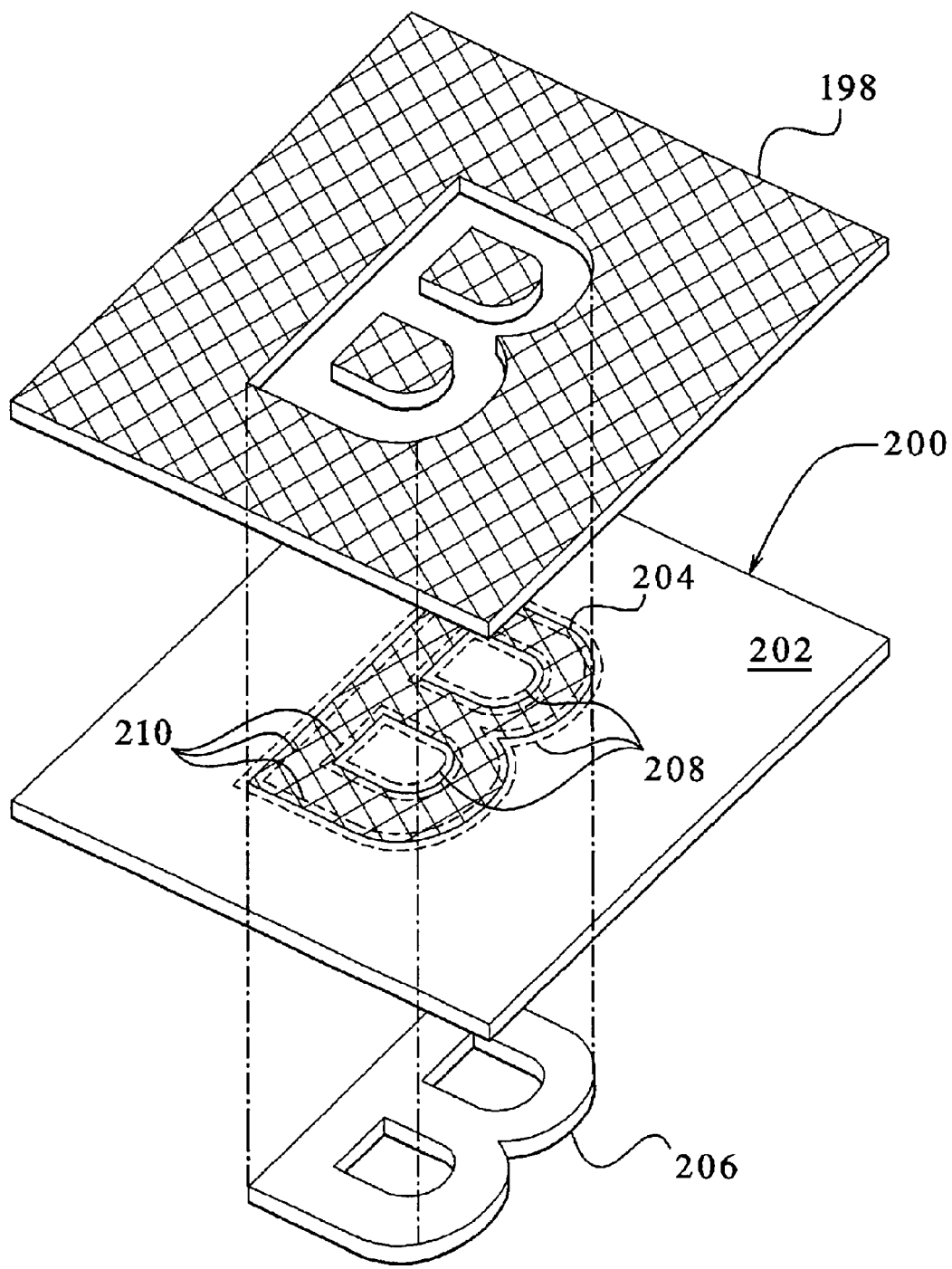
FIG. 16 is a schematic perspective view of a plurality of differently pigmented turf sections illustrating a cut and stitch method of producing a multi-pigmented turf segment.

Referring now to FIG. 16, a schematic perspective view of a plurality of turf sections 198 and 202 illustrates a second method by which a multi-pigmented artificial turf segment 200 of the multi-pigmented system 190 is produced. Initially, the turf section 198 is produced having a first, e.g., marking colored fiber, and the turf section 202 is produced having a second, e.g., base colored fiber. The letter "B" cutout 204 is cut or stamped from the first colored or marking section 198. The letter "B" cutout 206 is also cut or stamped from the second colored or base section 202.

In one implementation of this method, the first colored "B" cutout 204 is cut outwardly bigger in all directions along the dashed cut lines 208, e.g., 0.25 to 2 inches bigger (6.4 to 50.5 mm), than is the cutout 206. The first colored or marking fibers are removed from the primary and secondary backings (backings 86 and 88 in FIG. 15) of the cutout 204 in the areas constituting the overlap between the marking cutout 204 and the base cutout 206. The second colored section 202 is laid over the first colored cutout 204. The two sections are stitched together in the overlapping backing area to form the multi-pigmented turf segment 200.

In another implementation of this method, the reverse occurs. The first colored "B" cutout 204 is cut along the solid contour lines of the "B" shaped cutout 204. The second colored cutout 206 is cut inwardly smaller in all directions along the cut lines 210, e.g., 0.25 to 2 inches smaller (6.4 to 50.5 mm), than is the cutout 204. The second colored or base fibers are removed from the primary and secondary backings of the second colored turf section 202 in the areas constituting the overlap between the cutout 204 and the cutout 206. The first colored or marking cutout 204 is laid over the second colored section 202. The two sections are stitched together in the overlapping backing area to form the multi-pigmented turf segment 200.

It should be appreciated that third, fourth and fifth colored marking sections, etc., can be stitched into the multi-pigmented turf segment 200 via this method. The marking sections can all be a portion of the same marking. Alternatively, the marking sections can alone or in combination form a plurality of markings. The method allows for any number of complex shapes of any size, color or number of colors to be sewn or stitched into the base section 202, which itself is adaptable to be any color. In this method, the various different colored sections used to make the multi-pigmented turf segment 200 contain plastic or polypropylene fibers that are preferably dyed to their desired color. The dyes include fluorescent dyes and one or more or all of the colors of the section multi-pigmented turf segment 200 are adaptable to be fluorescent.

Figure 17:
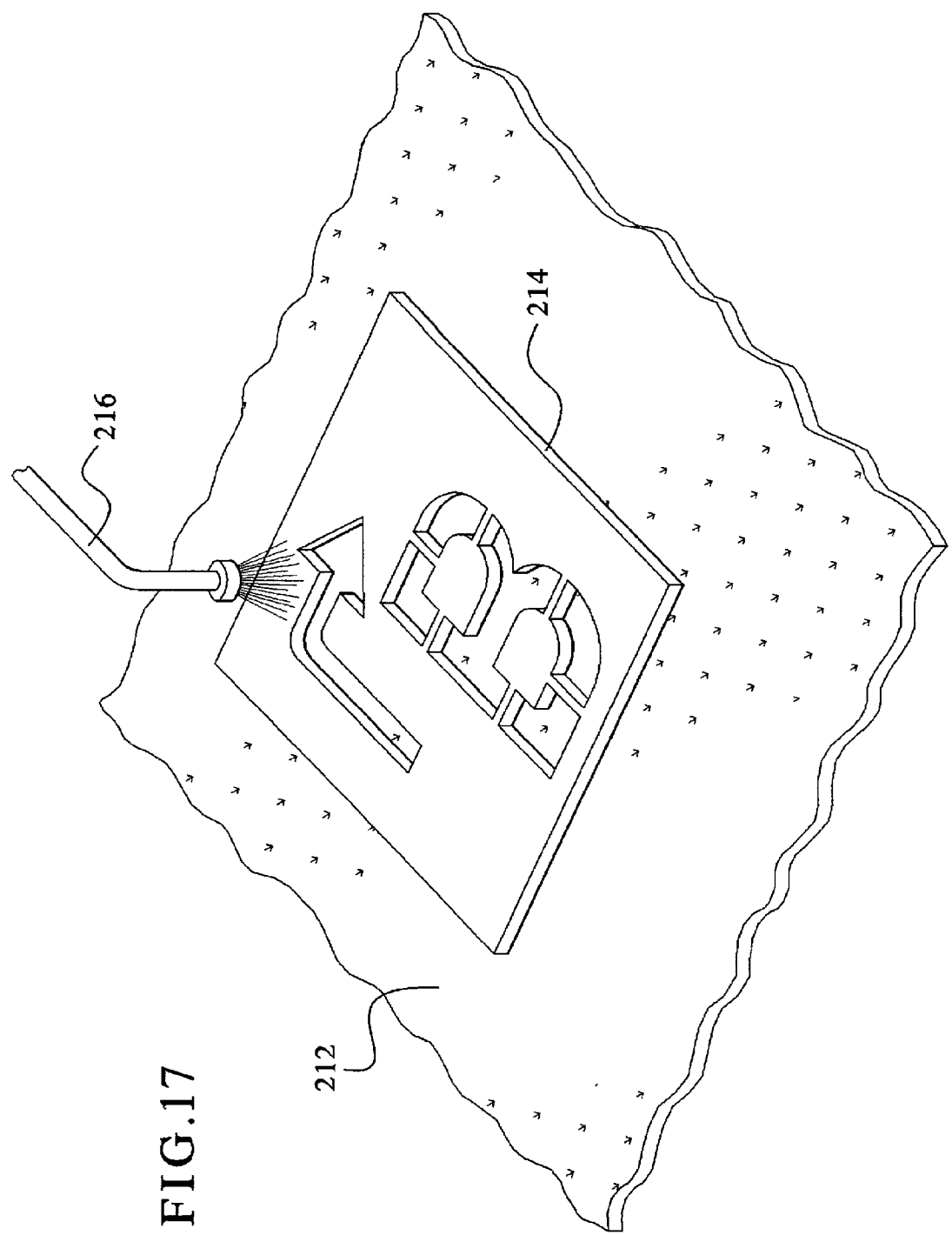
FIG. 17 is a schematic perspective view of a plurality of differently pigmented turf sections illustrating a stencil and paint method of producing a multi-pigmented turf segment.

Referring now to FIG. 17, a schematic perspective view of a turf section 212 illustrates a third method by which the multi-pigmented artificial turf 192 of the multi-pigmented system 190 is produced. A first or base colored turf section 212 has any desired base color. A plastic, wood or metal stencil 214 is laid over the base turf section 212. The method includes laying the stencil 214 on top of the artificial fibers or pressing the stencil 214 onto the turf section 212 so that the fibers to be painted a marking color protrude through the stencil 214. The stencil 214 is also adaptable to have sides (not illustrated) that extend downwardly and engage the top of the primary backing 86 (FIG. 15) of the turf section 212, to create vertical barriers that disallow paint from contacting undesired areas.

A suitable sprayer 216 sprays paint or primer or both onto desired areas of the turf section 212. A plurality of colors, including fluorescent colors, can be spayed using a single stencil 214. Using different stencils 214 and one or more different color, including fluorescent colors, for each stencil, the turf installer readily produces a multicolored turf segment of any size, complexity and having any number of colors. While paint is not suitable for natural grass; paint, on plastic or polypropylene is much more permanent. The plastic fibers do not have to be mowed, and the paint does not destroy the fibers. If the paint fades over time, the same turf section 212 can be intermittently repainted using the same stencil 214.

Multi-Pigmented Turf Areas

Figure 18:
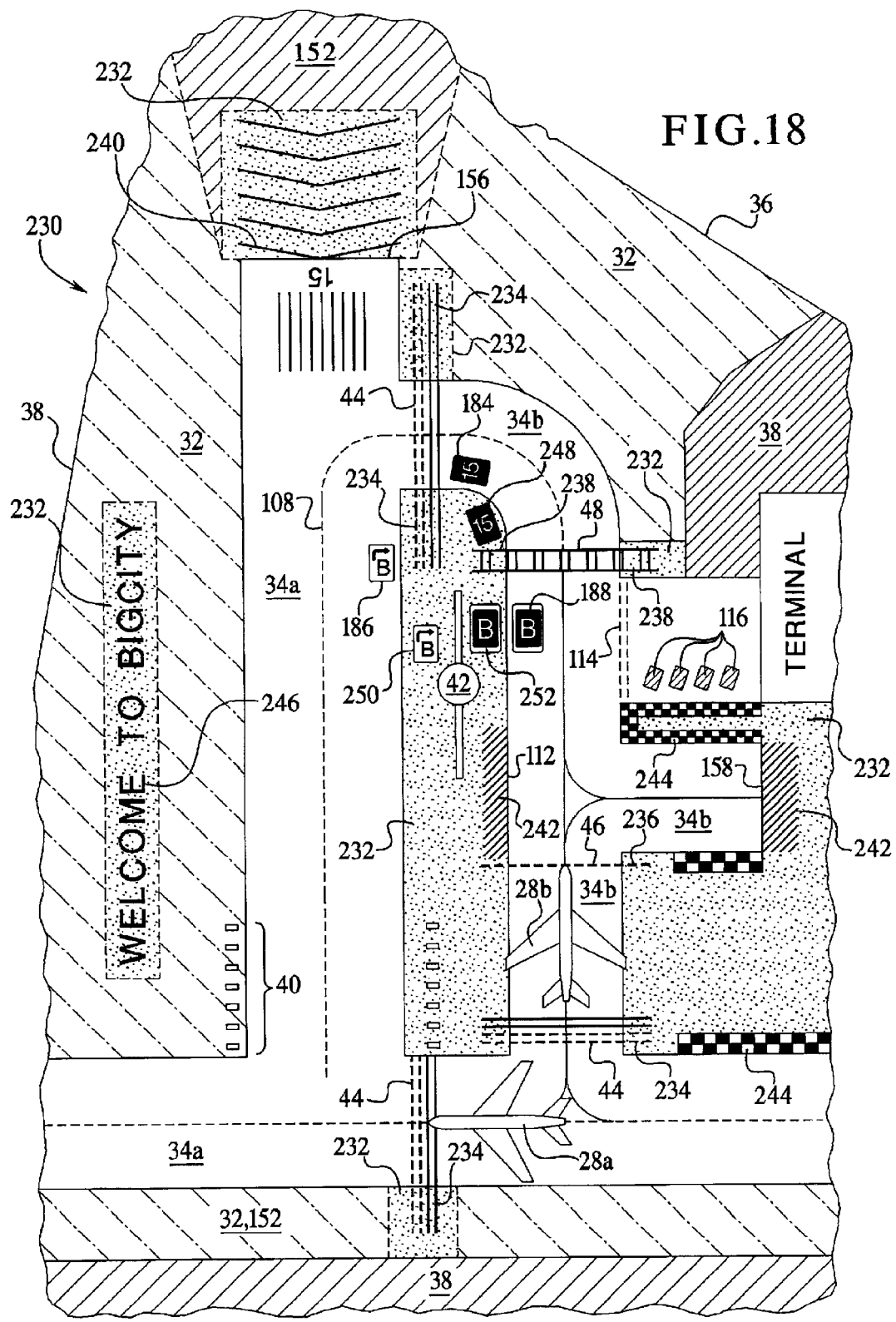
FIG. 18 is a fragmentary top plan view of an airport or airfield, illustrating sections of airport runways, taxiways and segments of adjacent artificial turf having marking fibers or strands which define safety indicia or markings.

Referring now to FIG. 18, a top plan view of an airport or airfield 230 includes one or more areas of synthetic turf 32, one or more areas 152 of artificial turf having an arrester base (which can also be multi-pigmented) and one or more segments 232 of artificial turf employing the multi-pigmented turf system 190 via the methods of manufacture discussed above with respect to FIGS. 14 through 17. The multi-pigmented turf segments 232 are generally adjacent to or near runways 34a and taxiways 34b or sections thereof as illustrated in FIG. 18, but may be substantially spaced away from such runways or taxiways.

The present invention includes the multi-pigmented artificial turf segments 232 touching or abutting or substantially touching or abutting the runways 34a or taxiways 34b. The present invention includes the multi-pigmented turf segments 232 residing anywhere on the premises of the airport or airfield and preferably in safety areas. In one preferred embodiment, the multi-pigmented turf segments 232 include touching or abutting both sides of a runway 34a or taxiway 34b and extending outward to the surrounding safety areas, as desired by the airport operator, builder or maintainer.

The multi-pigmented turf segments 232 are adapted to match any shape or contour created by the runways 34a or taxiways 34b, airport fences 36, natural grass areas 38 or by any other roads, driveways, accessways, pathways, trees, bushes, buildings, terminals, garages, hangers (not illustrated), or any other structures associated with an airport or airfield. The multi-pigmented turf segments 232 are likewise adaptable to accommodate any interior obstruction, such as any airport lighting 40, e.g., runway or approach lights, interior natural grass sections 38, drains or drainage ways 42, access roads, buildings, garages, hangers (not illustrated), or any other structures or apparatuses associated with an airport or airfield.

The present invention includes any multi-pigmented turf segment 232 extending any distance transversely or perpendicularly from the length of a runway 34a or taxiway 34b. The present invention also includes installing the multi-pigmented turf segments 232 on one or more of the runway ends 156 or taxiway ends 158. The base color or colors of the multicolored turf segments 232 preferably extend a workable distance (e.g., two to three feet, 0.61 to 0.91 m) past their airport markings to enable the turf installers to fix the turf to its base and to other turf sections without damaging the marking.

Many airports contain parallel runways 34a or taxiways 34b. In such cases, the present invention includes installing a multi-pigmented turf segment 232 having an extended section of the preferred natural base color, i.e., natural grass or green. As described above in connection with FIGS. 14 and 15, the multicolored turf segment 232 includes the base or natural turf color having any area of extension away from the other colors, i.e., the marking fibers. The segment 232 further includes the base color being any desired by the airport operator and is not limited to being green. The segment is also adaptable to have a plurality of base colors.

The multi-pigmented turf segments 232 also include a plurality of airport markings and symbols, which are normally either pavement markings or markings displayed by airport signs. In general, runway markings are white, while taxiway markings are yellow. Airport signs are typically either red and white or black and yellow. In many instances, information on airport signs, including airport boundary signs, is also painted on the airport runway 34a or taxiway 34b pavement. The present invention contemplates enhancing airport markings by extending the pavement markings and permanently displaying additional markings or signage on the multi-pigmented turf segments 232. It should be appreciated from the discussion in connection with FIGS. 14 and 15 that the synthetic markings are permanent, durable and adapted to be plowed, vacuumed, power washed, etc.

Runway and Taxiway Holding Position Markings

As illustrated in FIG. 18, one marking that the multicolored turf segments 232 include is a runway holding position marking 234. It is critical that pilots observe and properly obey the pavement runway holding position markings 44, which airports normally paint onto a runway 34a or taxiway 34b just prior to or adjacent to an intersecting runway 34a. The synthetic runway position markings 234 preferably match the like pavement holding and position markings 44 and therefore consist of four parallel lines, two solid and two dashed.

As illustrated by the airplane 28a, which is in a proper hold position, pilots should stop on the solid-line side of the pavement runway position markings 44. A pilot should not cross the pavement runway position markings 44 without tower control clearance. The pavement runway holding position markings 44 also designate when an aircraft has properly left or cleared the runway. An aircraft is not clear of the runway until all parts of the aircraft cross the pavement runway position markings 44. Airports also include runway position signs (not illustrated) having the same four lines, two solid and two dashed. Pilots exiting the runway observe these signs to properly exit the runway.

The multi-pigmented turf segments 232 preferably position the runway holding position markings 234 laterally adjacent to the pavement markings 44, which extend the pavement runway holding position markings 44 in one direction onto the multicolored turf segment 232 (e.g., to the left) or which extend the pavement markings 44 in both directions (e.g., to the left and to the right). The multi-pigmented turf segments 232 include the runway position markings 234 having any length and thereby extending the pavement markings 44 any distance desired by the airport operators. Depending upon how the artificial turf is rolled out, i.e., lengthwise along the runway 34a or taxiway 34b or perpendicular to such, the most economical length of the synthetic runway position markings 234 may be the width of a turf roll, e.g., 12 or 15 feet (3.65 to 4.57 m) or a multiple thereof.

The thickness and color of each of the lines of the synthetic runway position markings 234 and the respective spacing apart of the lines are preferably the same as the like pavement position markings 44. Prefabricated rolls of artificial or synthetic turf in one embodiment have one foot (30.5 cm) thick lines that are spaced apart ½ foot (15.25 cm), however, different airports may desire different line widths and spacing, in which case a synthetic turf segment 232 having a customized runway position marking 234 is provided. The color of the runway position markings 234 is preferably white or yellow depending upon whether the multicolored turf segment 232 abuts a runway 34a or taxiway 34b, respectively.

Extending the pavement markings 44 via the synthetic runway position markings 234 provides a plurality of benefits. Depending on the size of the aircraft, how high off the ground a pilot may be sifting and the current condition of the painted line on the runway or taxiway pavement, a pilot may not readily see the pavement runway position marking 44. A pilot's line of sight over the nose of the aircraft to align the nose to an invisible plane perpendicular to the aircraft is limited. Pilots, however, are readily able to see to their left or right. Thus, they can more accurately align the aircraft with the synthetic runway position marking 234 extending perpendicularly or transversely from the length of the runway 34a or taxiway 34b via a multi-pigmented turf segment 232.

Extending the pavement runway position markings 44 via the synthetic runway position markings 234, transversely or perpendicularly from the length of the runway 34a or taxiway 34b, enhances the pilot's ability to see the airport marking because the pilot can readily see in these directions. Furthermore, the permanent nature of the multicolored turf segments 232 having dyed white or yellow holding position fibers in stark contrast to the surrounding base green fibers further enhances the pilot's ability to see the synthetic runway position markings 234. In contrast, the usually gray pavement does not contrast the pavement markings 44 as well. Further, the paint of the pavement marking 44 may become worn or chipped.

Extending the pavement markings 44 via the synthetic runway position markings 234, transversely or perpendicularly from the length of the runway 34a or taxiway 34b also enhances the pilot's ability to see the airport marking when exiting a runway 34a because the pilot sees the synthetic holding position marking 234 on the multi-pigmented turf segments 232 before reaching the runway 34a or taxiway 34b onto which the pilot is to turn. The synthetic marking 234 is an additional, permanent, readily seen and well-delineated signal for the pilot exiting a runway 34a.

As illustrated in FIG. 18, another marking that the multicolored turf segments 232 include is a taxiway holding position marking 236. Pilots and ground crew drivers must observe and properly obey pavement taxiway holding position markings 46, which airports normally paint onto a runway 34a or taxiway 34b just prior to an intersecting taxiway 34b. The pavement taxiway position marking 46 consists of a single dashed line. As illustrated by the airplane 28b, which is in a proper hold position, pilots should stop before the dashed line of the pavement taxiway position marking 46 and should not cross without tower control clearance.

The present invention includes permanently extending the pavement taxiway position markings 46 by placing multi-pigmented turf segments 232 having synthetic taxiway holding position markings 236 adjacent to the pavement markings 46. The multicolored turf segments 232 preferably position the taxiway position markings 236 laterally adjacent to the like pavement markings 46, which extend the pavement taxiway position markings 46 in one direction onto the multi-pigmented turf segment 232 (e.g., to the left) or which extend the pavement markings 46 in both directions (e.g., to the left and to the right).

The multicolored turf segments 232 include the taxiway position markings 236 having any length and thereby extending the pavement markings 46 any distance desired by the airport operators. Depending upon how the artificial turf is rolled out, i.e., lengthwise along the runway 34a or taxiway 34b or perpendicular to such, the most economical length of the synthetic taxiway position markings 236 may be the width of a turf roll, e.g., 12 or 15 feet (3.65 to 4.57 m) or a multiple thereof.

The thickness and color of the dashed lines of the synthetic taxiway position markings 236 and the distance between the dashes are preferably the same as the like pavement taxiway position markings 46. Prefabricated rolls of artificial or synthetic turf in one embodiment have one foot (30.5 cm) thick lines, however, different airports may desire different line widths and dash spacing, in which case a synthetic turf segment 232 having a customized taxiway position marking 236 is provided.

The color of the taxiway position markings 236 is preferably white or yellow depending upon whether the multi-pigmented turf segment 232 abuts a runway 34a or taxiway 34b, respectively. The benefits of extending the pavement taxiway position markings 46 transversely or perpendicularly from the length of the runway 34a or taxiway 34b onto the multicolored turf segments 232, via the taxiway position markings 236, are the same as described for extending the pavement runway position markings 44.

ILS Critical Area Boundary Markings

As illustrated in FIG. 18, a further marking that the multi-pigmented turf segments 232 include is an ILS boundary marking 238. It is critical that pilots observe and properly obey the pavement instrument landing system ("ILS") boundary markings 48, which airports normally paint onto a runway 34a or taxiway 34b to mark the boundary of an ILS critical area. Airplanes must taxi beyond or out of the ILS critical area or past the pavement boundary markings 48 or stop short of the pavement boundary markings 48 (depending upon the direction of travel) when the airport is using the instrument landing system. An aircraft taxiing into an ILS critical area can interfere with the ILS signal to approaching aircraft. The pavement ILS boundary markings 48 consist of two longer parallel lines and a plurality of shorter, evenly spaced apart, perpendicular line pairs, as illustrated in FIG. 18.

The present invention includes permanently extending the pavement ILS boundary markings 48 by placing multicolored turf segments 232 having synthetic ILS boundary markings 238 adjacent to the pavement markings 48. The multi-pigmented turf segments 232 preferably position the ILS boundary markings 238 laterally adjacent to the pavement markings 48, which extend the like pavement ILS boundary markings 48 in one direction onto the multicolored turf segment 232 (e.g., to the left) or which extend the pavement markings 48 in both directions (e.g., to the left and to the right).

The multi-pigmented turf segments 232 include the ILS boundary markings 238 having any length and thereby extending the pavement markings 48 any distance desired by the airport operators. Depending upon how the artificial turf is rolled out, i.e., lengthwise along the runway 34a or taxiway 34b or perpendicular to such, the most economical length of the synthetic ILS boundary markings 238 may be the width of a turf roll, e.g., 12 or 15 feet (3.65 to 4.57 m) or a multiple thereof.

The thickness and color of the parallel and perpendicular lines of the synthetic ILS boundary markings 238 and the distances between the parallel lines and the perpendicular lines are preferably the same as the like pavement ILS boundary markings 48. Prefabricated rolls of artificial or synthetic turf in one embodiment have one foot (30.5 cm) thick lines, however, different airports may desire different line widths and spacing, in which case a synthetic turf segment 232 having a customized ILS boundary marking 238 is provided.

The color of the ILS boundary markings 238 is preferably white or yellow depending upon whether the multicolored turf segment 232 abuts a runway 34a or taxiway 34b, respectively. The benefits of extending the paved ILS boundary markings 48 transversely or perpendicularly from the length of the runway 34a or taxiway 34b onto the multi-pigmented turf segments 232, via the ILS boundary markings 238, are the same as described for extending the pavement runway position markings 44.

Runway and Taxiway End Markings

Airports typically place yellow chevron markings at a runway's end to designate an area that is unusable for landing, takeoff and taxiing. Referring to FIG. 18, one or more multicolored turf segments 232 provide one or preferably a plurality of preferably yellow synthetic chevron markings 240. The multi-pigmented turf segment 232 having the synthetic chevron markings 240 preferably abuts a runway end 156. The present invention includes providing prefabricated multicolored turf segments 232 having a predetermined number of chevron markings 240 of a predetermined size. The airport operator, alternatively, specifies the number and size of chevron markings 240 for the turf area 32, whereby a custom multi-pigmented turf segment 232 having the specified chevron markings 240 is provided.

Although the chevron markings 240 include having any customized thickness, in one embodiment they are 1 foot (30.5 cm) thick. A chevron marking 240 preferably individually includes two orthogonal or otherwise angled lines (e.g., 45 degrees from runway centerline 108) having ends that meet substantially along the preferably dashed centerline 108 of the runway 34a and ends that terminate substantially along an extension of the runway edge lines. The chevron markings 240 are preferably evenly spaced apart so as to appear to form a series of arrows pointing toward the safe landing, take-off and taxiing area of the runway 34a.

The multicolored turf segment 232 having the chevron markings 240 also includes having an arrester bed base 78 as discussed above. As disclosed in connection with FIGS. 10 and 11, the arrester base 78 is also installed at either or both ends 156 of a runway 34a for the purpose of absorbing the energy and safely slowing a runaway aircraft. The present invention includes the multicolored turf segment 232 displaying the above described chevron markings 240 and having an arrester bed base 78, wherein the chevron markings extend from the runway end 156 for some or all of the distance of the arrester bed base 78, which is below the artificial multi-pigmented turf segment 232. The arrester base 78 in one embodiment extends under the entire multicolored turf segment 232 and continues underneath an arrester bed area 152 for a predetermined distance.

It should be appreciated that the multi-pigmented turf segments 232 are adaptable for any marking subsequently developed by the industry or set by regulation for standardized use with the arrester bed system 160 discussed in connection with FIG. 11 or other arrester bed systems adapted to slow the motion of a runaway aircraft. Furthermore, the multicolored turf segments 232 also include having the above described chevron markings 240 in non-arrester bed areas, i.e., in areas not having an arrester bed base 78.

Airports typically place white end markings at a taxiway end to designate that a taxiway does not extend into the marked area and that the area is unusable for taxiing. Referring to FIG. 18, one or more multicolored turf segments 232 include one or preferably a plurality of preferably white synthetic taxiway end markings 242. The synthetic taxiway end markings 242 designate actual taxiway ends 158 as well as any area, such as the multi-pigmented turf segment 232 abutting the taxiway side 112 at the intersection of two taxiways 34b, in which the airport operator desires to indicate that a taxiway 34b does not continue. In FIG. 18, the taxiway end markings 242 on the multicolored turf segment 232 abutting the side 112 indicate that the taxiway 34b does not continue through the intersection. The taxiway end markings 242 on the multi-pigmented turf segment 232 abutting the taxiway end 158 indicate that the taxiway 34b physically ends.

The airport operator preferably determines the number of synthetic taxiway end markings 242 for the multicolored turf segment 232 to permanently display. The taxiway end markings 242 include having any desired thickness and length and are one foot (30.5 cm) thick in one embodiment. The taxiway end markings 242 preferably collectively include a plurality of parallel markings, which are at a predetermined angle, e.g., 45 degrees, from the taxiway end 158 or an area of a taxiway side 112 that the airport operator wishes to mark. The taxiway end markings 242 are preferably evenly spaced apart so as to collectively appear to form a blocked-off area of multi-pigmented turf 232, wherein the taxiway end markings 242 are collectively substantially as wide or wider than the width of the taxiway 34b.

Extending synthetic chevron markings 240 and taxiway end markings 242 transversely or perpendicularly from the runway end 156 or from the taxiway end 158 or side 112 via the multicolored turf segments 232 enhance a pilot's or ground crew's ability to navigate safely throughout the airport 230. Until now, attempting to permanently display the chevron markings and taxiway end markings on natural grass would be futile. Moreover, the permanent nature of the multi-pigmented artificial turf segments 232 having dyed yellow or white fibers for the chevron markings 240 or the taxiway end markings 242, respectfully, in stark contrast to the surrounding base green fibers, further enhances the pilot's and ground crew's ability to see the synthetic chevron markings 240 or end markings 242 in comparison with similar pavement markings.

No Parking Area and Ground Message Markings

Airports typically display double dashed taxiway edge lines 114 to designate a portion of the edge of a taxiway 34b in which adjoining pavement is available for taxi. FIG. 18 illustrates that in these high traffic areas and in other areas of the airport 30 that are susceptible to a large flow of airplane taxiing as well the movement ground vehicles 116, the multicolored turf segments 232 have synthetic no parking area markings 244. The no parking area markings 244 designate areas in which an airplane's wing or tail may clip or hit a parked ground vehicle 116 or other aircraft. The synthetic no parking area markings 244 also designate areas in which it is vital to keep the area free and clear for airplanes 28a and 28b and/or ground vehicles 116.

As illustrated in FIG. 18, the synthetic no parking area markings 244 in one embodiment include a plurality of checkered rows of multi-pigmented artificial turf. In one embodiment the checkers comprise a row of one foot by one foot (30.5 cm by 30.5 cm) square areas of alternating color next to a similar row having the colors reversed. The alternating colors include red and white, yellow and black, white and black, yellow and green, white and green or any other combination of these colors or other colors desired by the airport operator. The squares include being any size and the checkers include any number of alternating rows, however, the squares are preferably big enough and there are preferably enough rows for a pilot or driver to readily see the area from at least 20 to 50 feet (6.1 m to 15.25 m) away. In one embodiment, the checkered rows extend a perpendicular distance of three to thirty feet (0.91 m to 9.1 m) from the edge or end of a runway 34a, taxiway 34b or other pavement area of the airport 230.

It should be appreciated that the synthetic no parking area markings 244 are adaptable to include other markings or indicia subsequently developed by the industry or set by regulation, wherein the industry developed or regulated markings or indicia extend perpendicularly from a paved area onto the multicolored artificial turf segments 232 for a predetermined distance. Moreover, the synthetic no parking area markings 244 are adaptable to include a customized design by an airport operator or a particular pattern used by an airport.

FIG. 18 further illustrates that the multi-pigmented turf segments 232 include having permanent character markings 246, whereby the airport 30 communicates, in writing, with pilots, passengers, the ground crew, etc. The character markings 246 include English, Spanish or French lettering or any lettering of any other language desired by the airport operators. The character markings 246 also include Arabic or Roman numerals, punctuation or any other characters found on a standard typewriter. The character markings 246 include being any size and in one embodiment are large enough to be seen from ten miles (16.1 km). The multicolored turf segments 232 include character markings 246 that welcome air passengers to the city to which the airport belongs or services. Other character markings 246 designate the name of the airport, the number of a runway or other landing instruction desired by the airport operator. The character markings 246 include being any color and are preferably white, yellow or other marking color that contrasts well with the preferably green base color of the multi-pigmented turf segments 232.

Holding Position, Directional and Location Markings

As seen in FIG. 18, airports typically display one or more pavement painted holding position signals 184, directional signals 186 and/or location signals 188 on the paved runways 34a or taxiways 34b. The pavement holding position signals 184 direct an aircraft to hold short of a particular runway, while on a taxiway. The pavement directional signals 186 inform the pilot of the direction and designation of an upcoming intersecting runway 34a or taxiway 34b, an upcoming intersection of a plurality of runways 34a or taxiways 34b or an upcoming intersection of a combination of runways 34a and taxiways 34b. The location signals 188 identify the current runway or taxiway on which the aircraft is located.

As illustrated in FIG. 18, the airport markings of the multi-pigmented turf segments 232 include having one or more synthetic holding position signals 248, one or more synthetic directional signals 250 and/or one or more synthetic location signals 252. In accordance with known airport markings, both the synthetic holding position signals 248 and the synthetic location signals 252 preferably include a darker background, e.g., black or red, and lighter lettering or numbering, e.g., white. The synthetic directional signals 250 preferably include a lighter background, e.g., white or yellow and a darker lettering or numbering, e.g., black. The multicolored artificial turf segments 232 provide these synthetic markings in a smaller size, same size or larger size than their pavement counterparts.

The synthetic signals 248, 250 and 252 include being in lieu of the paved surface signals 184, 186 and 188, respectively, or in addition to the paved surface signals (especially in areas that accumulate snow). If in lieu of the pavement surface signals, 184, 186 and 188, the locations of the synthetic holding position signals 248, the directional signals 250 and the location signals 252, respectively, are preferably at or near the location of the runway 34a or taxiway 34b on which the pavement markings would appear. If in addition to pavement surface signals, the locations of the synthetic signals 248, 250 and 252 are preferably near or a slight distance away from the location of the runway 34a or taxiway 34b on which the pavement markings appear.

The latter scenario enhances the paved airport signals by providing an additional and preferably earlier communication or direction to the pilot. Even when in lieu of the pavement signals, however, the artificial turf holding position signals 248, the directional signals 250 and the location signals 252 will likely appear more visible and wear better over time than would the same pavement signals.

Figure 19:
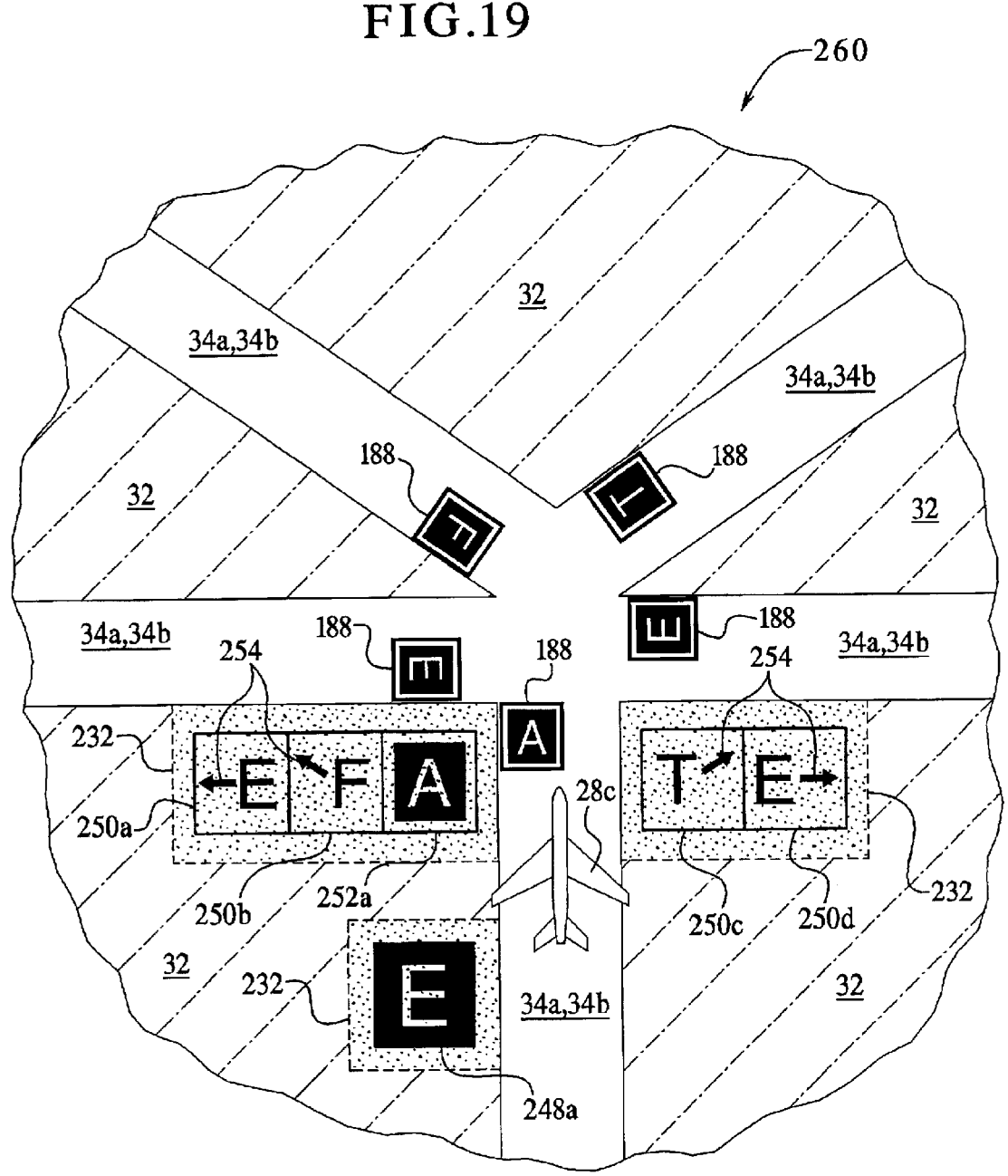
FIG. 19 is a fragmentary top plan view of an airport or airfield, illustrating sections of airport runways, taxiways and segments of adjacent artificial turf having marking fibers or strands which define holding position, direction and location signals.

Referring now FIG. 19, a top plan view of an airport or airfield 260 includes areas of artificial turf 32 and multi-pigmented turf segments 232, which have various synthetic safety markings or indicia of the present invention. Both the turf areas 32 and the multicolored turf segments 232 are preferably adjacent to and extend from the runways 34a and taxiways 34b or sections thereof. Each of the pavement location signals 188, "A," "E," "F" and "T" designates a runway 34a or a taxiway 34b for the purposes of this illustration. The airplane or aircraft 28c currently resides on the runway or taxiway "A" and must make a turn onto one of the other runways or taxiways "E," "F" or "T." For purposes of illustration, only the synthetic holding position signals 248, the directional signals 250 and the location signals 252 are illustrated, although the multi-pigmented turf segments 232 include having any of the above described artificial turf markings.

The airport 260 illustrates one embodiment of the present invention, wherein the pilot must choose between a plurality of different runways 34a and/or taxiways 34b. In such a situation, airports typically display one or a bank of pavement or upright signs, having the indicia of the synthetic signals 250a, 250b, 250c, 250d, 248a and 252a, to direct the pilot. As illustrated in FIG. 19, the upright or pavement signs have been replaced by multicolored turf segments 232 displaying the same bank of indicia as permanent artificial turf markings.

The multi-pigmented turf segments 232 provide the synthetic directional signals 250a through 250d. The synthetic directional signals 250a through 250d include directional arrows 254 pointing in approximate alignment with their respective runways 34a or taxiways 34b relative to the pilot's perspective. The directional signals 250a through 250d also include the designation (e.g., "E," "F" or "T") of the respective runway 34a or taxiway 34b. The directional signals 250a through 250d include being as big as necessary for the pilot of the airplane 28c to easily see the synthetic markings. The directional signals otherwise preferably follow the FAA standards as far as color and the relative sizing and spacing of the four-sided border, the directional arrows 254 and the internal lettering and/or numbering.

The left turn directional signals 250a and 250b preferably include the directional arrows 254 on the left side of the marking, while the right turn directional signals 250c and 250d preferably include the directional arrows 254 on the right side of the marking. Similarly, the present invention includes placing the left turn directional signals 250a and 250b on the left side of the runway or taxiway "A" and the right turn directional signals 250c and 250d on the right side of the runway or taxiway "A." Alternatively, the present invention includes placing the entire bank of directional signals 250a through 250d on either or both sides of the runway or taxiway "A." The relatively large synthetic directional signals 250a through 250d, placed to the left or right of the runway or taxiway "A," enable the pilot of the airplane 28c to easily see the location and direction of the upcoming runways 34a or taxiways 34b.

The multicolored turf segments 232 also include one or more of the synthetic holding position markings 248, such as the holding position marking 248a. The synthetic position marking 248a includes being as big as necessary for the pilot of aircraft 28c to easily see it. The position marking 248a otherwise preferably follows the FAA standards as far as color and the relative sizing and spacing of the four-sided border to the internal lettering and/or numbering. The relatively large synthetic position signal 248a, placed to the left or right of the taxiway "A" (in this case "A" is a taxiway), enables the pilot of the airplane 28c to easily see that the pilot should hold short of a runway "E" while on the taxiway "A" and await tower control clearance.

The multi-pigmented turf segment 232 also includes one or more of the synthetic location signals 252, such as the location signal 252a. The synthetic location signal 252a includes being as big as necessary for the pilot of aircraft 28c to easily see it. The markings otherwise preferably follow the FAA standards as far as color and relative sizing and spacing of the dark four-sided border, the inner lighter border and the internal lettering and/or numbering. The relatively large synthetic location signal 252a, placed to the left or right of the runway or taxiway "A," enables the pilot of aircraft 28c to easily see that the aircraft currently sits on the runway or taxiway "A."

While the present invention is described in connection with what is presently considered to be the most practical and preferred embodiments, it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims, and this application is limited only by the scope of the claims.

The invention is hereby claimed as follows:

1. An artificial turf for providing a marking at an airport, the artificial turf comprising:
    a backing;
    a plurality of base fibers secured to the backing; and
    a plurality of first marking fibers secured to the backing so as to visually define at least a portion of a first airport marking, the first marking fibers located on the backing so that the turf installed along a runway or taxiway at the airport is so positioned and arranged that at least a portion of a like pavement marking appears on the runway or taxiway of the airport adjacent to the first marking fibers.

2. The artificial turf of claim 1, wherein the base fibers and the first marking fibers have different pigmentation.

3. The artificial turf of claim 1, which includes a plurality of second marking fibers secured to the backing so as to visually define a portion of the first airport marking.

4. The artificial turf of claim 3, wherein the base fibers, first marking fibers and second marking fibers have different pigmentation.

5. The artificial turf of claim 3, which includes a plurality of third marking fibers secured to the backing so as to visually define a portion of the first airport marking.

6. The artificial turf of claim 5, wherein the base fibers, first marking fibers, second marking fibers and third marking fibers have different pigmentation.

7. The artificial turf of claim 1, which includes a plurality of second marking fibers secured to the backing so as to visually define at least a portion of a second airport marking.

8. The artificial turf of claim 1, which includes a plurality of third marking fibers secured to the backing so as to visually define at least a portion of a third airport marking.

9. The artificial turf of claim 1, wherein the backing includes a first backing section securing the base fibers, the first backing section attached to a second backing section securing the first marking fibers.

10. The artificial turf of claim 1, wherein the backing includes a plurality of individually attached backing sections, wherein each backing section secures a visually different fiber.

11. The artificial turf of claim 1, wherein the first airport marking, defined at least partially by the first marking fibers, is installed so as to be aligned with the like pavement marking.

12. The artificial turf of claim 1, wherein the first airport marking, visually defined at least partially by the first marking fibers, is adapted to inform a pilot to hold a position.

13. The artificial turf of claim 1, wherein the first airport marking, visually defined at least partially by the first marking fibers, is adapted to direct a pilot where to move an airplane.

14. The artificial turf of claim 1, wherein the first airport marking, visually defined at least partially by the first marking fibers, is adapted to inform a pilot of an airplane's current position in the airport.

15. The artificial turf of claim 1, wherein the first airport marking, visually defined at least partially by the first marking fibers, is adapted to define an end of a runway.

16. The artificial turf of claim 1, wherein the first airport marking, visually defined at least partially by the first marking fibers, is adapted to define an end of a taxiway.

17. The artificial turf of claim 1, wherein the first airport marking, visually defined at least partially by the first marking fibers, is adapted to define a hazardous parking area.

18. The artificial turf of claim 1, wherein the first airport marking is a marking chosen from the group consisting of: a runway holding position line, a taxiway holding position line, an instrument landing system boundary marking, a holding position signal, a direction signal and a location signal.

19. An artificial turf for providing a marking at an airport, the artificial turf comprising:
    a backing;
    a plurality of base fibers secured to the backing; and
    a plurality of marking fibers secured to the backing so as to visually define at least a portion of an airport marking, wherein the marking fibers have a different pigment than the base fibers, the marking fibers located on the backing so that the turf installed along a runway or taxiway at the airport is sized and positioned proximate to the runway or taxiway to provide an aid to a pilot or ground personal to navigate through the airport.

20. The artificial turf of claim 19, wherein the marking fibers are disposed adjacent to the base fibers.

21. The artificial turf of claim 19, wherein the marking fibers are disposed directly adjacent to the base fibers.

22. The artificial turf of claim 19, wherein the base fibers have a fluorescent pigment.

23. The artificial turf of claim 19, wherein the marking fibers have a fluorescent pigment.

24. The artificial turf of claim 19, wherein the marking fibers are painted to produce the different pigment.

25. The artificial turf of claim 19, wherein the marking fibers are painted with fluorescent paint to produce the different pigment.

26. The artificial turf of claim 19, wherein the airport marking is installed at an airport so as to be aligned with a like pavement marking.

27. The artificial turf of claim 19, wherein the airport marking includes a character.

28. The artificial turf of claim 19, wherein the airport marking includes a character and a border around the character.

29. The artificial turf of claim 19, wherein the airport marking includes a plurality of parallel lines.

30. The artificial turf of claim 19, wherein the airport marking includes a dashed line.

31. The artificial turf of claim 19, wherein the airport marking includes a plurality of parallel lines and a plurality of intersecting lines perpendicular to the parallel lines.

32. The artificial turf of claim 19, wherein the airport marking includes a plurality of chevrons.

33. The artificial turf of claim 19, wherein the airport marking includes a plurality of checkered four sided shapes.

34. The artificial turf of claim 19, wherein the airport marking includes an arrow.

35. The artificial turf of claim 19, wherein the airport marking includes an arrow adjacent to a character.

36. An airport marking system comprising:
a backing;
a plurality of base fibers secured to the backing;
a plurality of marking fibers secured to the backing, wherein the marking fibers are visually different from the base fibers; and
an attachment mechanism that secures the backing to a runway or taxiway of an airport.

37. An airport marking and arrester bed system comprising:
a backing;
a plurality of base fibers secured to the backing;
a plurality of marking fibers secured to the backing, wherein the marking fibers are visually different from the base fibers;
a base beneath the backing, the base adapted to slow a moving aircraft; and
an attachment mechanism that secures the backing to a runway or taxiway of an airport.

38. The artificial turf of claim 1, wherein the first airport marking, defined at least partially by the first marking fibers, is larger than the like pavement marking.

39. The artificial turf of claim 1, wherein the first airport marking is positioned adjacent to and slightly in front of, from a standpoint of a moving aircraft or vehicle, the like pavement marking.

40. The artificial turf of claim 1, which includes fibers secured to the backing so as to visually define at least a portion of a second marking visible from an aircraft landing at the airport.

41. The artificial turf of claim 40, wherein the second marking includes at least one character selected from the group consisting of: English wording, Spanish wording, French wording, Arabic numerals, Roman numerals, punctuation and any characters found on a typewriter.

42. The artificial turf of claim 1, wherein the airport marking resides on two sides of the runway or taxiway.

43. The artificial turf of claim 19, wherein the airport marking, defined at least partially by the first marking fibers, repeats a marking displayed on the runway or taxiway.

44. The artificial turf of claim 43, wherein the airport marking, defined at least partially by the first marking fibers, is larger than the marking on the runway or taxiway.

45. The artificial turf of claim 19, wherein the airport marking is positioned slightly in front of, from a standpoint of a moving aircraft or vehicle, a like pavement marking.

46. The artificial turf of claim 19, wherein the airport marking is a first airport marking and which includes marking fibers secured to the backing so as to visually define at least a portion of a second marking visible from an aircraft landing at the airport.

47. The artificial turf of claim 46, wherein the second marking includes at least one character selected from the group consisting of: English wording, Spanish wording, French wording, Arabic numerals, Roman numerals, punctuation and any characters found on a typewriter.

48. The artificial turf of claim 19, wherein the airport marking resides on two sides of the runway or taxiway.

49. The airport marking system of claim 36, wherein the marking fibers define at least a portion of an airport marking selected from the group consisting of: a runway holding position line, a taxiway holding position line, an instrument landing system boundary marking, an aircraft/safety vehicle holding position signal, an aircraft/safety vehicle direction signal and an aircraft/safety vehicle location signal.

50. The airport marking system of claim 36, wherein the marking fibers define at least a portion of an airport marking that repeats a marking displayed on the runway or taxiway.

51. The airport marking system of claim 50, wherein the airport marking, defined at least partially by the first marking fibers, is larger than the marking on the runway or taxiway.

52. The airport marking system of claim 36, wherein the airport marking is positioned slightly in front of, from a standpoint of a moving aircraft or vehicle, a like pavement marking.

53. The airport marking system of claim 36, wherein the marking fibers define at least a portion of an airport marking visible from an aircraft landing at the airport.

54. The airport marking system of claim 53, wherein the airport marking includes at least one character selected from the group consisting of: English wording, Spanish wording, French wording, Arabic numerals, Roman numerals, punctuation and any characters found on a typewriter.

55. An airport marking system comprising:
a backing installed adjacent to a runway or taxiway of an airport;
a plurality of base fibers secured to the backing; and
a plurality of marking fibers secured to the backing, wherein the marking fibers define at least a portion of an airport marking with respect to the base fibers, the airport marking selected from the group consisting of: a runway holding position line, a taxiway holding position line, an instrument landing system boundary marking, an aircraft/safety vehicle holding position signal, an aircraft/safety vehicle direction signal and an aircraft/safety vehicle location signal, the airport marking sized and positioned proximate to the runway or taxiway to provide an aid to a pilot or ground personal for navigation through the airport.

56. The airport marking system of claim 55, wherein the airport marking repeats a marking displayed on the runway or taxiway.

57. An airport marking system comprising:
a backing installed adjacent to a runway or taxiway of an airport;
a plurality of base fibers secured to the backing; and
a plurality of marking fibers secured to the backing, wherein the marking fibers define at least a portion of an airport marking that is visible from an aircraft landing at the airport, the airport marking sized and positioned proximate to the runway or taxiway to provide an aid to a pilot for landing the aircraft.

58. The airport marking system of claim 57, the airport marking includes at least one character selected from the group consisting of: English wording, Spanish wording, French wording, Arabic numerals, Roman numerals, punctuation and any characters found on a typewriter.

59. The airport marking system of claim 57, wherein at least one of the base fibers and the marking fibers includes a repelling fiber on which it is uncomfortable for a bird or animal to walk.

* * * * *